US012682692B2

(12) United States Patent
Tyomkin et al.

(10) Patent No.: US 12,682,692 B2
(45) Date of Patent: Jul. 14, 2026

(54) ASSET SIGNAL MONITORING ENGINE FOR A VIRTUAL FLEET AND ASSET MODELING PLATFORM

(71) Applicant: Caterpillar Inc., Peoria, IL (US)

(72) Inventors: Dmitry Tyomkin, Buffalo Grove, IL (US); Tamara Fitz, Chicago, IL (US); Abhilash Reddy Vedavally, Schaumburg, IL (US); Noel Johny, Chicago, IL (US)

(73) Assignee: Caterpillar Inc., Peoria, IL (US)

( * ) Notice: Subject to any disclaimer, the term of this patent is extended or adjusted under 35 U.S.C. 154(b) by 149 days.

(21) Appl. No.: 18/534,118

(22) Filed: Dec. 8, 2023

(65) Prior Publication Data

US 2025/0191410 A1 Jun. 12, 2025

(51) Int. Cl.

| | |
|---|---|
| ***G07C 5/00*** | (2006.01) |
| ***G06F 9/451*** | (2018.01) |
| ***G06F 11/26*** | (2006.01) |
| ***G06F 11/30*** | (2006.01) |
| ***G07C 5/08*** | (2006.01) |
| ***G08G 1/00*** | (2006.01) |

(52) U.S. Cl.
CPC ........... *G07C 5/008* (2013.01); *G07C 5/0841* (2013.01); *G08G 1/20* (2013.01)

(58) Field of Classification Search
CPC ........ G07C 5/008; G07C 5/0841; G08G 1/20; G06F 9/451; G06F 11/26; G06F 11/263; G06F 11/302; G06F 11/3684; G06F 11/3688; G06F 11/3698
USPC .......................................................... 701/31.4
See application file for complete search history.

(56) References Cited

U.S. PATENT DOCUMENTS

| | | | | |
|---|---|---|---|---|
| 9,014,910 | B2 | 4/2015 | Grau et al. | |
| 11,403,541 | B2 * | 8/2022 | Thomsen | G06N 5/048 |
| 11,741,760 | B1 * | 8/2023 | Dubin | G08G 1/13 340/990 |
| 2016/0036835 | A1 * | 2/2016 | Lietz | H04L 63/145 726/22 |
| 2020/0265329 | A1 | 8/2020 | Thomsen et al. | |
| 2020/0349589 | A1 * | 11/2020 | Southall | G06Q 10/087 |
| 2022/0036266 | A1 | 2/2022 | Bomer et al. | |
| 2022/0051361 | A1 | 2/2022 | Cella et al. | |

(Continued)

FOREIGN PATENT DOCUMENTS

EP 3331261 B 9/2019

OTHER PUBLICATIONS

Written Opinion and International Search Report for Int'l. Patent Appln. No. PCT/US2024/055700, mailed Feb. 20, 2025 (15 pgs).

*Primary Examiner* — Tyler D Paige

(57) ABSTRACT

The disclosed system for testing of fleet management software generates virtual assets (e.g., simulations of machinery) that are associated with simulated sensor values. For at least one particular asset in the set, the system generates simulated application programming interface (API) messages. For at least one simulated API message in the simulated API message set, the system parses, from the simulated API message, simulated message data that relates to message flow through integration points. The system generates a visualization that includes an indication of system latency for messages flowing through the integration points. The system latency is determined based on the simulated message data.

18 Claims, 17 Drawing Sheets

(56) References Cited

U.S. PATENT DOCUMENTS

| | | | | |
|---|---|---|---|---|
| 2022/0301361 | A1 | 9/2022 | Cawse | |
| 2022/0382425 | A1* | 12/2022 | Southall | G06Q 10/063 |
| 2023/0128293 | A1* | 4/2023 | Isaacs | G06F 9/451 |
| 2023/0133940 | A1 | 5/2023 | Giurgiu et al. | |
| 2025/0117313 | A1* | 4/2025 | Tyomkin | G06F 11/3696 |
| 2025/0191410 | A1* | 6/2025 | Tyomkin | G06F 9/451 |

* cited by examiner

ASSET SIGNAL MONITORING ENGINE FOR A VIRTUAL FLEET AND ASSET MODELING PLATFORM

BACKGROUND

Telematics applications, including digital twins, can make use of data collected from various types of assets, such as vehicles and equipment. Test data management (TDM) systems for telematics applications enable testing of various operational scenarios. TDM systems for telematics applications can rely solely on telematics data collected from in-field devices. This approach can introduce various technical problems, including scarcity of test data for certain specific scenarios, increased network traffic, vulnerability of test data to security breaches, performance inaccuracies due to, for example, remote asset connectivity issues and communication infrastructure failures, and data integration challenges across different asset types.

SUMMARY

In-field equipment can generate a wealth of operating data using on-board sensors. The data can be utilized by fleet management and telematics applications to improve performance of the equipment, enable autonomous operation, minimize collisions and other accidents, and prevent unforeseen resource depletion. Problematically, test data for specific, complex scenarios, such as in situations where readings from multiple sensors are fused to generate a synthetic sensor value, may not be readily available.

The disclosed system enables automatic generation of test scenarios in telematics applications. Here, the term "scenario" refers to a sequence of computer-executable operations that simulate performance of a particular asset (e.g., a vehicle, mobile machinery) or a group of assets (e.g., mixed-asset fleet) and/or generate asset-related predictions based on the simulations. For instance, the disclosed system can be used for testing of fleet management software.

In some implementations, the system generates virtual assets (e.g., simulations of machinery) that are associated with simulated sensor values. For at least one particular asset in the set, the system generates a simulated application programming interface (API) message definition structured to capture the set of simulated sensor values. The system binds the set of virtual assets to a simulation scenario record that includes a trigger condition. The system causes a scheduler to detect that the trigger condition is met, fetch the simulation scenario record, and generate simulated API messages for the assets according to the API message definitions.

The scenarios described herein can include complex simulations of asset performance. The simulations can use data points, such as asset sensor data, test data that approximates asset sensor data, and/or synthetic (virtual) values generated, for example, based on a set of real or simulated sensor values and/or additional data, such as weather condition data, road traffic monitoring data, road condition monitoring data, elevation data, location data, map data, and so forth. The simulations can also include parametrized functions that generate sets of these data items using parameters, such as starting points, step functions, end points, random value generators, or combinations thereof. The simulations can be performed by specially programmed hardware and/or software, including AI/ML models, such as neural networks, classification models, regression models, image recognition models, and/or image generators. In some implementations, the system optimizes input data, obtained from sensors, for the AI/ML models in situations where the input data may not be suitable for processing in the native format and/or where processing too many observation instances may constrain the use of computing resources.

Additionally, the disclosed system enables test scenario scheduling across multiple virtual assets, which can help with accelerated identification of asset issues by providing the ability to reproduce test scenarios without generating asset data from scratch. By enabling execution of test scenarios using fused sensor values, the disclosed system can also simulate complex edge computing scenarios (e.g., where synthetic sensor data is generated by distributed network nodes) to be tested prior to placing sensors in production. More generally, the simulated API messages can securely supply development teams with diverse types of data for test scenarios.

Additionally, the disclosed system enables automatic asset signal monitoring, including, for example, determining system latency metrics for communication channels between various integration points. The integration points can include one or more of an internet-of-things gateway, a telematics server, an application router, a consolidated data store, or an asset utilization data store. The latency metrics can include message wait times between integration points (e.g., wait time 326*d*), sets of time stamps (e.g., message creation timestamp 352, gateway receipt timestamp 354) for a transaction (e.g., signal, API message, sensor value, synthetic value, a digital representation of an analog signal), transaction counts, maximum system latency values, minimum system latency values, and/or average system latency values. The latency metrics can be associated with signal aggregations, such as, for example, signal aggregations by transaction type, file type, and so forth. Asset signal monitoring can be further enhanced by using user-interactive visualizers, which can present aggregations and/or system latency metrics associatively mapped to the corresponding visualizations of signal subsets.

BRIEF DESCRIPTION OF THE DRAWINGS

Detailed descriptions of implementations of the present invention will be described and explained through the use of the accompanying drawings.

Figure 1:
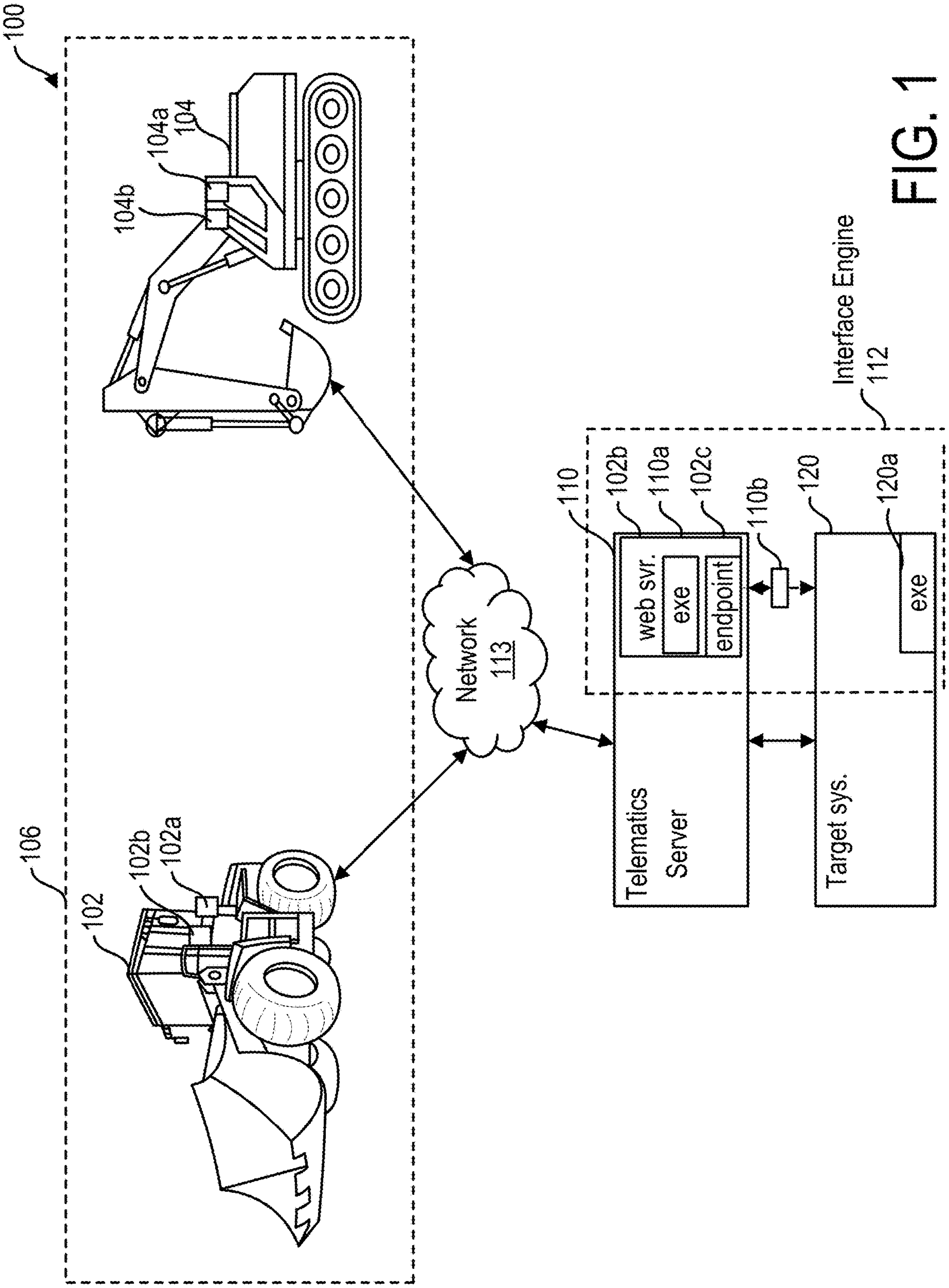
FIG. 1 shows an example telematics ecosystem for monitoring of vehicles and machinery.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

As used herein, the term "set" refers to a physical or logical collection of objects, which can contain no objects (e.g., a null set, an empty set), one object, or two or more objects. The terms "engine", "application", and "executable" refer to one or more sets of computer-executable instructions, in compiled or executable form, that are stored on non-transitory computer-readable media and can be executed by one or more processors to perform software- and/or hardware-based computer operations. The computer-executable instructions can be special-purpose computer-executable instructions to perform a specific set of operations, as defined by parametrized functions, specific configuration settings, special-purpose code, and/or the like. Engines, applications, and executables can generate and/or receive various electronic messages.

Telematics Ecosystem

FIG. 1 shows an example telematics ecosystem 100 for monitoring of various assets, such as vehicles and machinery. In operation, the one or more assets (102, 104) can generate operating data captured by various sensors (102*a*, 104*a*). The operating data can be transmitted, via the network 113, to one or more telematics servers 110, which can generate API messages 110*b* to transmit the operating data, in original or modified form, to various target computing system(s) 120. The target computing system(s) 120 can use the received data as training data (e.g., for AI/ML systems), for analytics relating to operating conditions of the assets (102, 104) and so forth.

One or more types of assets (102, 104) can be included in a particular fleet 106. The assets (102, 104) in the particular fleet 106 can be associated with one or more original equipment manufacturer (OEM). The assets (102, 104) can include various mobile machinery items, such as earth moving machinery, mobile construction machinery and so forth, which perform various tasks, such as excavation, loading, transportation, drilling, spreading, compacting, and/or trenching of earth, rock and other materials and can be deployed for work on roads, in quarries, in mines and so forth. Accordingly, the assets (102, 104) can include dozers, loaders (swing loaders, skid-steer loaders, backhoe loaders, and so forth), excavators, trenchers, dumpers, scrapers, graders, landfill compactors, rollers, pipelayers, drills, tool carriers, drainage pipe layers, ploughs, mixers (e.g., concrete mixers) and so forth. The assets (102, 104) can be individual machines or combinations of devices (e.g., combinations of base machines and equipment or attachments, such as augers, buckets, blades, tillers, forks, rakes, trenchers, shears, compactors, pulverizers, and so forth) where the combinations can be identified by a product identification number (PIN), machine serial number, or another identifier. According to various implementations, the assets (102, 104) can be direct-controlled devices (e.g., devices controlled by an operator in physical contact with the device) and/or self-propelled devices. The assets (102, 104) can be ride-on devices, non-riding direct-controlled devices, non-riding remote controlled devices, mobile remote-controlled devices, and so forth. The assets (102, 104) can be wire-controlled and/or wireless-controlled.

Assets (102, 104) generate and report various items of information. To generate and report the information, assets (102, 104) can each include a set of sensors (102*a*, 104*a*) and a set of controllers (102*b*, 104*b*). The sensors (102*a*, 104*a*) are structured to enable monitoring a variety of operating conditions, including real-time operating conditions of the assets (102, 104) and real-time operating conditions for asset components (e.g., engine, attachments and so forth). The sensors (102*a*, 104*a*) can collect operating data, which is transmitted by the controllers (102*b*, 104*b*), via the network 113, to one or more telematics servers 110. The network 113 can operate according to one or more wired or wireless protocols, such as Wi-Fi, cellular, radio, satellite, Bluetooth, ZigBee, etc. To enable transmission of data and traffic management, the network 113 can include connectivity equipment, such as modems, Bluetooth transceivers, Bluetooth beacons, RFID transceivers, NFC transmitters, and the like. In some implementations, the network 113 can include a controller area network (CAN) of a particular asset (102, 104).

The sensors (102*a*, 104*a*) can provide analog readings and/or digital readings. The information provided by the sensors can be used to perform on-board and/or remote diagnostics of the assets (102, 104) and can relate to various operating parameters of the assets (102, 104). For example, sensors (102*a*, 104*a*) can provide on-demand and/or periodic readings regarding engine-out exhaust gas temperature, NOx levels, speed, engine torque, asset (102, 104) positioning, temperature, tire pressure, load measurement, fuel consumption, and so forth. The sensors (102*a*, 104*a*) can also provide indications of operator engagement with or actuation (including automatic/autonomous actuation) of various components of the asset (102, 104), such as steering wheel, attachment positioning levers, acceleration pedals, and so forth. According to various implementations, the sensors (102*a*, 104*a*) can include radar components, lidar components, cameras, ultrasonic devices, GPUs (global positioning units) and/or other suitable components.

The controllers (102*b*, 104*b*) can activate, operate, and/or control sensors (102*a*, 104*a*), fuse the readings of multiple sensors (102*a*, 104*a*), convert analog values to digital values, generate electronic messages containing sensor readings, and/or transmit sensor readings, via the network 113, to one or more telematics servers 110. The controllers (102*b*, 104*b*) can include hardware and/or software circuitry and can be associated with particular components of assets (102, 104). For instance, controllers (102*b*, 104*b*) can include engine control units (ECUs) that control engine operations. In other examples, controllers (102*b*, 104*b*) can include powertrain control modules (PCMs), brake control modules (BCMs), door control units (DCU)s, speed control units (SCUs), transmission control modules (TCMs), battery management systems (BCMs), telematics control units (TCUs), and so forth.

An example controller (102*b*, 104*b*) can be an electronic controller. The elements of an electronic controller (102*b*, 104*b*) can include, for instance, a processor/microcontroller, memory (e.g., SRAM, EEPROM, Flash), input devices (supply voltage and ground, digital input devices, analog input devices), output devices (actuator drivers, such as injectors, relays, valves), logic outputs, communication circuitry and equipment (CAN transceivers, Ethernet transceivers), and various embedded software modules (boot loaders, metadata, configuration data). Accordingly, in some implementations, controllers (102*b*, 104*b*) can be structurally and/or communicatively integrated with sensors (102*a*, 104*a*). For instance, in an example where a particular controller (102*b*, 104*b*) is a TCU structured to collect, pre-process, and/or transmit telematics data, the controller (102*b*, 104*b*) can include a navigation unit (sensor (102*a*, 104*a*) that keeps track of the latitude and longitude of the asset (102, 104)), a mobile communication transceiver (e.g., GSM, GPRS, Wi-Fi, WiMax, LTE or 5G), a memory, a processor, and/or a battery module and/or another power source (e.g., an interface to the power system of the asset (102, 104)).

In telematics, edge computing techniques can offer a technical advantage of offloading complex processing tasks to edge computing systems in networks of computing systems, where the edge computing systems can pre-process sensor data for transmission to other nodes. Edge computing techniques can reduce the size of data transmissions and optimize network traffic. More specifically, edge computing techniques can optimize the use of transmission media bandwidth, increase the informational value of transmitted data, and/or increase the overall information throughput on a particular network. To that end, controllers (102*b*, 104*b*) can include edge computing features and can pre-process data from sensors (102*a*, 104*a*) by, for example, generating data averages, discarding data outliers, discarding repeated sensor data via periodic sampling, and so forth. In some implementations, the controllers (102*b*, 104*b*) can provide raw sensor data to the telematics server 110, which can perform edge computing operations by the executable 110*a* prior to transmitting the sensor data to the target computing system(s) 120. In some implementations, the controllers (102*b*, 104*b*) are integrated with the telematics server 110. For example, the controllers (102*b*, 104*b*) can include the executable 110*a*, and/or multiple executables 110*a* can be distributed across a particular controller (102*b*, 104*b*) and telematics server 110.

In some implementations, the telematics server 110 can perform additional (e.g., increased-complexity) edge operations, such as generating virtual sensor values using information provided by multiple types of sensors (102*a*, 104*a*). In an example use case, autonomous and/or semi-autonomous assets (102, 104) can benefit from comprehensive scene understanding accomplished by fast and reliable object recognition and accurate position detection for various components and attachments of a particular asset (102, 104). The sensors (102*a*, 104*a*) can be included in an array of sensors. The array can include different sensor types, such as radar, lidar, camera, and/or ultrasonic sensors, to capture different types of information. The captured units of information can be combined (e.g., at the telematics server 110) to improve the accuracy of object detection and vehicle positioning. The executable 110*a* at the telematics server 110 can include a fusion engine that can combine information from various sensors. For example, the executable 110*a* can combine raw reflection data from lidar, radar, and/or ultrasonic sensors (102*a*, 104*a*) with raw frame data from camera sensors (102*a*, 104*a*) and/or additional data to more accurately estimate a distance from a particular surface point on the asset (102, 104) or its attachment to the object photographed by the camera. In some examples, the additional data can be collected by a set of inertial movement unit (IMU) sensors (102*a*, 104*a*) and can include, for example, multi-axial acceleration data collected via accelerometer(s) of the IMU and/or multi-axial velocity data collected via gyroscope(s) of the IMU. In some examples, the additional data can include multi-axial translational movement data (surge, heave, sway), multi-axial rotational movement data (roll, pitch, yaw) and so forth. The sensors (102*a*, 104*a*) can be mounted at suitable surface points or joints of assets (102, 104) or attachments to enable collection of these types of data.

In some implementations, instead of or in addition to performing edge operations, the telematics server 110 can collect, via the controller (102*b*, 104*b*), raw or preprocessed sensor readings. Using raw or preprocessed sensor (102*a*, 104*a*) data, the telematics server 110 can generate electronic API messages 110*b* and transmit the electronic API messages 110*b* to target computing system(s) 120.

The target computing system(s) 120 can include various executables 120*a* structured to enable management and analytics of data about the assets (102, 104). For example, the executables 120*a* can enable safety monitoring, real-time or substantially real-time communication, detection of operating conditions, monitoring of mileage, monitoring of fuel consumption, monitoring of weather conditions, wear and tear monitoring, load monitoring and so forth. In some implementations, the target computing systems 120 can include AI/ML applications, which can be trained to generate predictions based on the input data received, in the form of API messages 110*b*, by the target computing system(s) 120. For example, the AI/ML applications can be trained to generate predictions for fuel consumption levels based on the data that includes asset model identification, asset type, asset attachment identification, asset application/use and duration, and/or asset fuel consumption for particular time periods (hourly, daily, and so forth). As another example, the AI/ML applications can be trained to generate simulations that enable digital twin operations, including, for example, operating condition prediction, object position prediction, and/or prediction of values and operating scenarios using other operating parameters of a particular asset (102, 104) or fleet 106.

The executables 120*a* use specific types of data to perform their intended tasks. Therefore, the API messages 110*b* can include sensor data and/or additional data that augments or supplements the sensor data. For example, the API messages 110*b* (or data collected by the target computing system(s) 120 through other channels) can include service records for assets (102, 104), complaint, defect, and/or recall records for assets (102, 104), part replacement history for assets (102, 104) including part identifiers, and so forth. In some implementations, the target computing system(s) 120 can receive, via API messages 110*b* or otherwise, additional data, such as weather condition data, road traffic monitoring data, road condition monitoring data, elevation data, location data, map data, and so forth.

The API messages 110*b* can be generated by the interface engine 112, which can include one or more web servers/web services engines 110*d*, one or more endpoints 102*c*, and/or one or more executables (110*a*, 120*a*). The API messages 110*b* can be structured according to a standard (e.g., ISO-15143 or similar) that enables computing systems to exchange telematics data. The API messages 110*b* can include collections of addressable data elements, which can be structured as delimited records (e.g., comma-delimited, semicolon-delimited, space-delimited, and so forth), key-value pairs or nested key-value pairs (e.g., .json), labeled or tagged data or nested labeled/tagged data (e.g., .xml), and/or tabular data (e.g., SQL datasets, Excel datasets, and so forth).

In some implementations, executables 120*a* at target computing system(s) 120 can obtain, update and/or otherwise interact with the data resources in the API messages 110*b* by causing computer-executable commands to be executed and transmitted via a communication channel, such as http, https, and so forth. Accordingly, the telematics server 110, target computing system 120, and/or TDM computing systems described further herein can be identified by a uniform resource locator (URL), and the computer-executable commands can include http operations, such as post (i.e., to create an item at the specified destination), get (i.e. to read an item from a specified destination), put or patch (i.e. to update a portion of an item in the specified destination), and/or delete (i.e. to delete an item in a specified destination).

A particular API message 110*b* can include the attributes sufficient to generate a particular unit of information about the asset (102, 104). The units of information can be provided by a set of corresponding API endpoints 112*c* (i.e. digital locations where the interface engine 112 receives requests for specific resources) at the web server 102*d*. Example units of information, also referred to as API resources, can include snapshot information (e.g., fleet snapshot, equipment snapshot) and/or time series information (e.g., fault code time series, location time series, switch status time series, attachment status time series, operating hours time series, idle operating hours time series, fuel used time series, engine condition time series, and/or remaining fuel time series).

Fault code time series can include items such as fault code identifier, description, severity, source system, reported date/time and so forth. Location time series can include items such as latitude, longitude, altitude, date/time and so forth. Switch status time series, attachment status time series, and/or engine condition time series can include items such as asset on/off status, part number (e.g., engine number, switch number, attachment part identifier), date time, and so forth. The operating hours time series, idle operating hours time series, fuel used time series, and/or remaining fuel time series can include items such as value, date/time and so forth. Various additional time series data, such as distance, fuel remaining (e.g., value, percentage), diesel exhaust fluid remaining (e.g., value, percentage) and so forth can be included.

The snapshot information messages can include cumulative and/or point-in-time data for any of the above time series data items for a particular asset (102, 104) or a fleet 106 of assets (102, 104). An example fleet snapshot can include information for a set of assets (102, 104) in a particular fleet 106. A fleet snapshot message 110*b* can include, for example, header information containing a fleet identifier, asset identifiers, and/or asset information (OEM, model, equipment type, equipment identifier, serial number and so forth). An asset snapshot message 110*b* can include, for example, header information including asset information.

Test Data Management System for Virtual Fleet and Asset Modeling

Figure 2A:
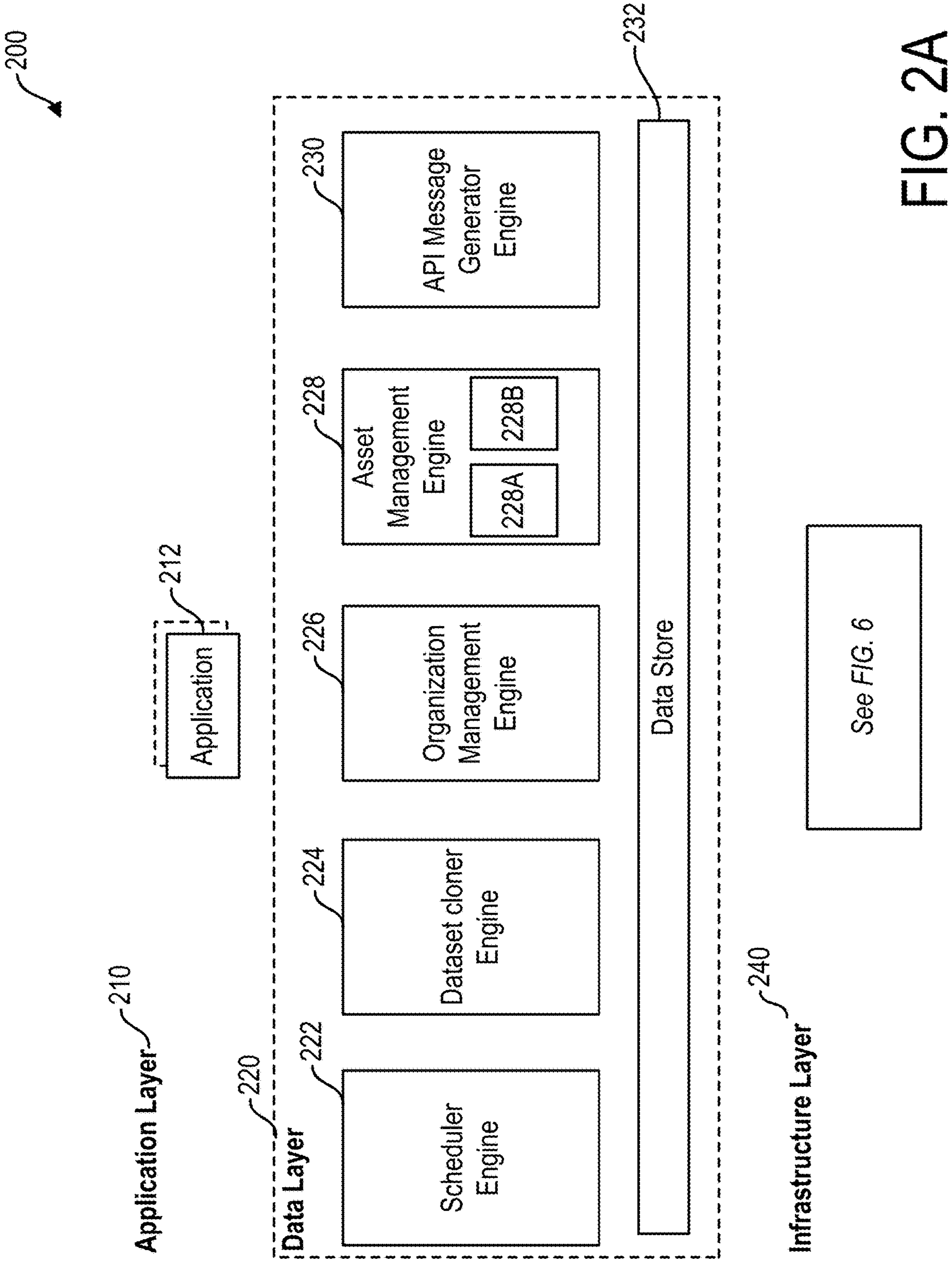
FIG. 2A shows an example test data management (TDM) system, such as a TDM system for virtual fleet and asset modeling.
Figure 2B:
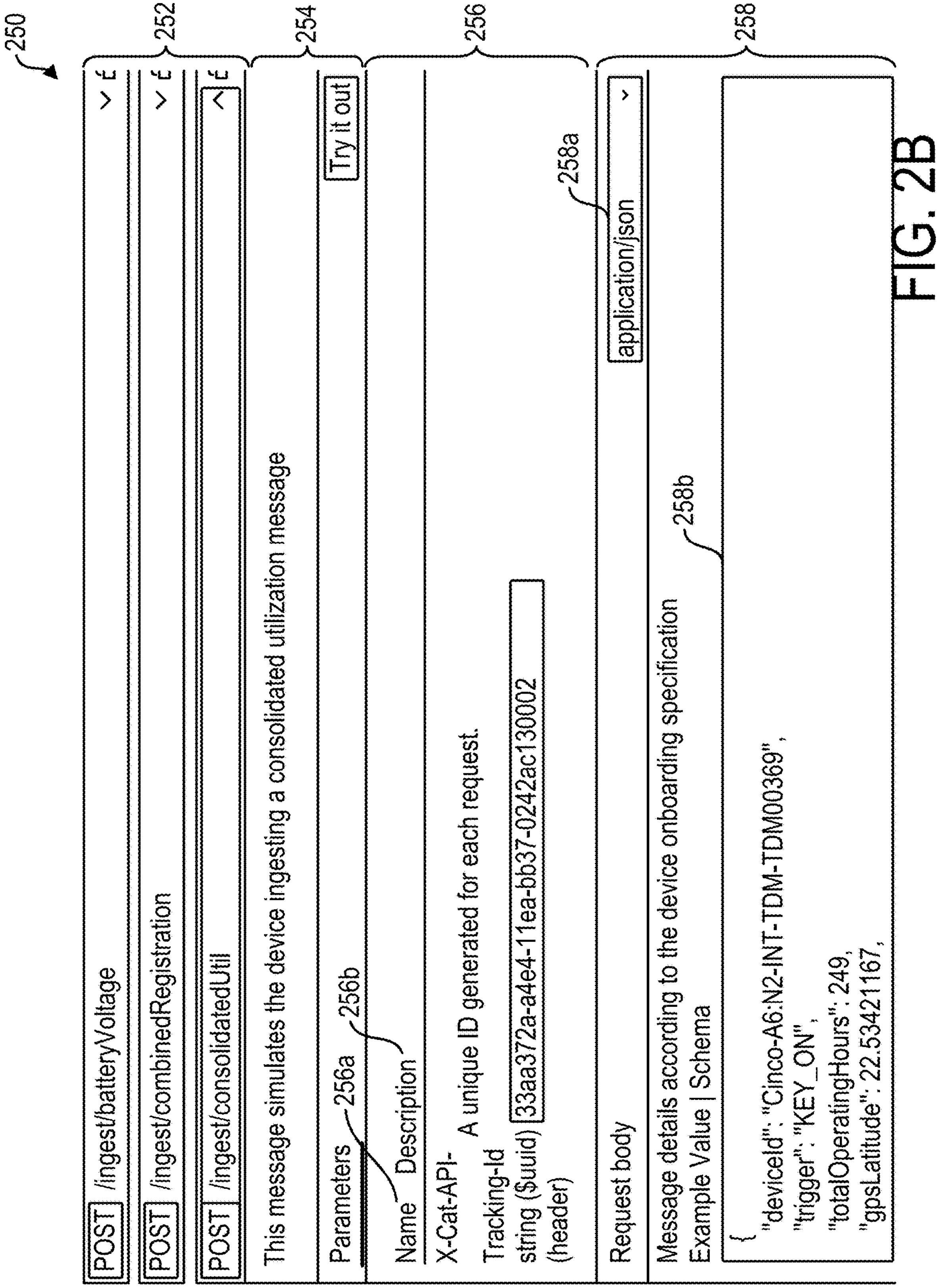
FIG. 2B shows an example graphical user interface (GUI) for an application programming interface (API) message generated, using the system of FIG. 2A, to simulate operations of the telematics ecosystem of FIG. 1.
Figure 2C:
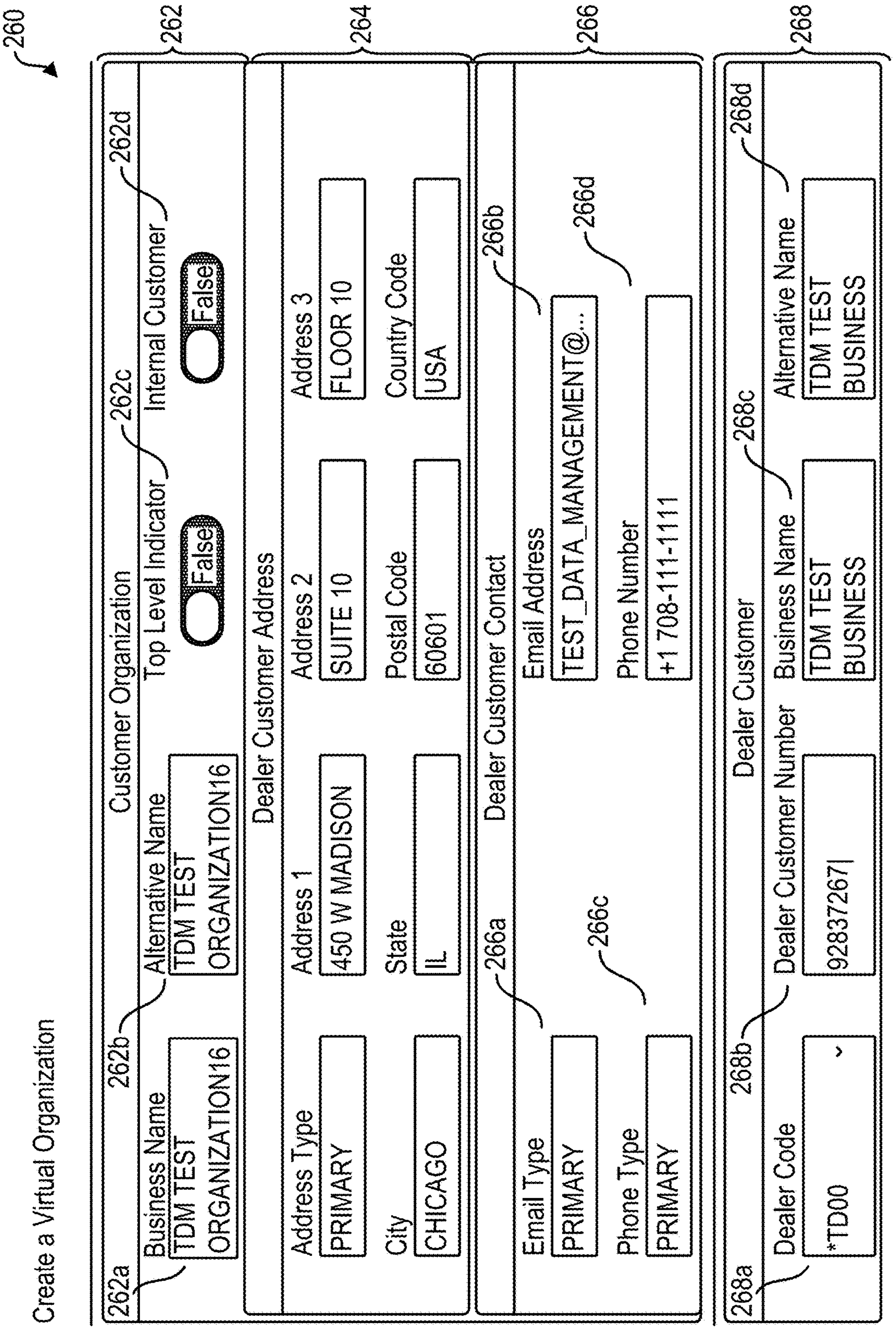
FIG. 2C shows an example GUI for generating a virtual organization, using the system of FIG. 2A, to simulate operations of the telematics ecosystem of FIG. 1.
Figure 2D:
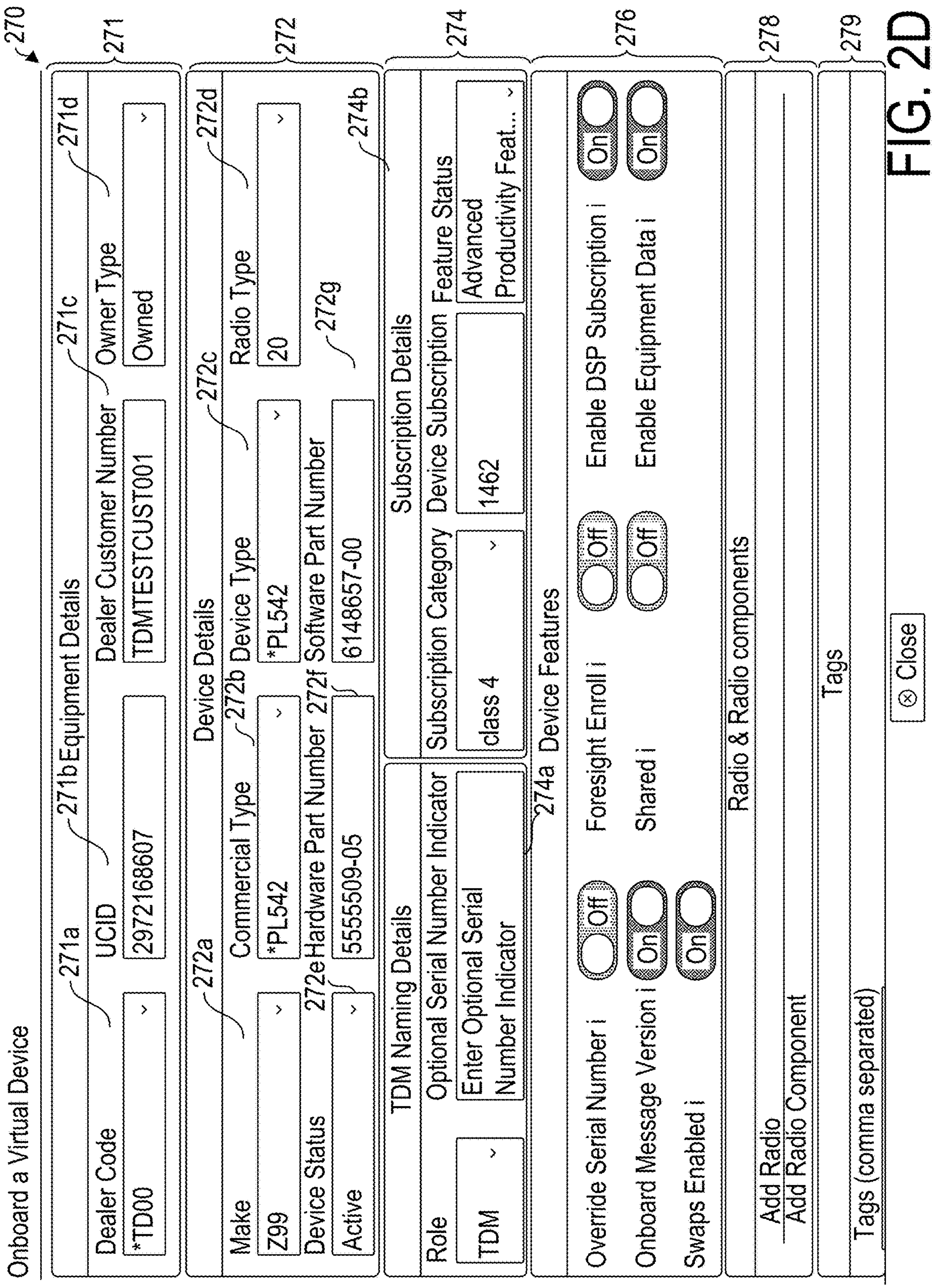
FIG. 2D shows an example GUI for generating a virtual asset, using the system of FIG. 2A, to simulate operations of the telematics ecosystem of FIG. 1.
Figure 2E:
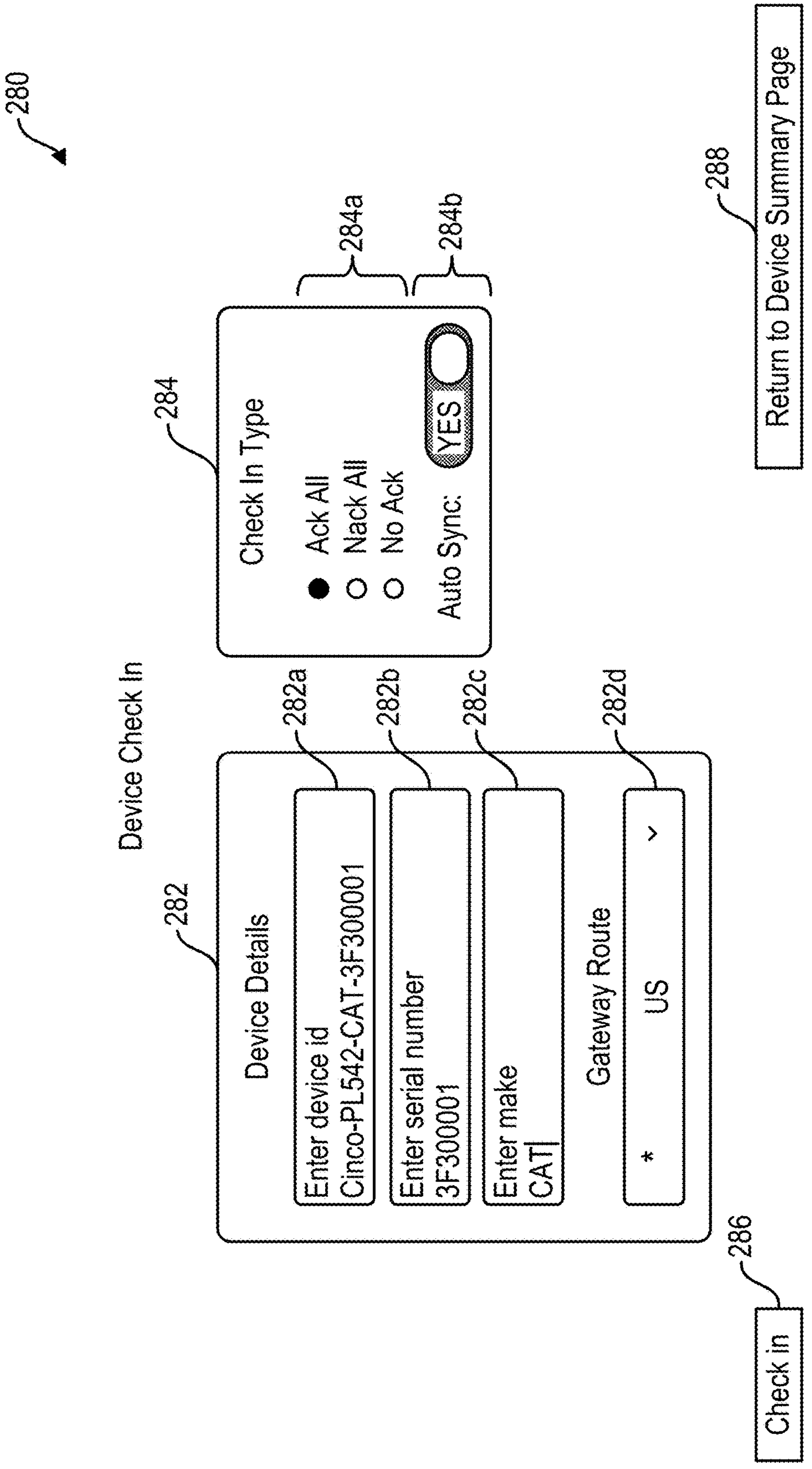
FIG. 2E shows an example GUI for checking in a virtual asset, using the system of FIG. 2A, to simulate operations of the telematics ecosystem of FIG. 1.

FIG. 2A shows an example TDM system 200, such as a TDM system for virtual fleet and asset modeling. The TDM system 200 enables the generation, management, and execution of computer-based operations for virtual fleet and modeling scenarios. For example, the TDM system 200 can be utilized to simulate various operations of the ecosystem 100 of FIG. 1, including organization management, fleet management, asset management, API message generation and so forth. To that end, the TDM system 200 enables management of test data items and data stores, scenario scheduling, and so forth. These operations can be performed using various interfaces, which can include GUIs of FIGS. 2B-2E. For example, FIG. 2B shows an example GUI 250 for an API message generated to simulate operations of the telematics ecosystem 100 of FIG. 1. FIG. 2C shows an example GUI 260 for generating a virtual organization. FIG. 2D shows an example GUI 270 for generating a virtual asset. FIG. 2E shows an example GUI 280 for checking in a virtual asset.

The TDM system 200 can be deployed in a cloud-based or on-premises manner. In some implementations, multiple instances of the TDM system 200 can be deployed in a software-as-a-service (SaaS) mode. Such instances of the TDM system 200 can share various physical and/or virtualized computing resources, such as storage, memory, and/or processors.

As shown, the TDM system 200 includes an application layer 210, a data layer 220, and an infrastructure layer 240. Together, these layers form a TDM system 200 stack, which includes particularly configured hardware and software components structured to enable computer-based operations of the TDM system 200.

The application layer 210 can include one or more applications 212. The applications 212 can include web-based applications, desktop applications, and/or mobile applications and can enable the TDM system 200 to be accessible from a variety of computing devices, including desktop computers, smartphones, tablets, diagnostic devices (e.g., on-board diagnostics (OBD) code readers and/or scan tools), and so forth. The applications 212 can be structured to perform various tasks that use telematics data, for example, in the form of API messages 110*b* of FIG. 1. For instance, the applications 212 can be structured to perform asset safety monitoring, bidirectional asset communication, detection of asset operating conditions, monitoring of asset mileage, monitoring of asset fuel consumption, monitoring of weather conditions in a particular asset deployment area, asset wear and tear monitoring, asset load monitoring, asset performance modeling (e.g., via digital twin techniques) and so forth. In various implementations, the applications 212 can be deployed and/or managed by an OEM associated with a particular asset, a customer of the OEM (e.g., a dealer), and/or a third party relative to the OEM and/or the customer of the OEM.

The applications 212 can use various forms of authentication. The forms of authentication can use keys, certificates, and/or tokens, including, for example, public/private key pairs in a public/private key (PKI) infrastructure, OAuth tokens, internet-of-things (IoT) device certificates, X.509 certificates, and so forth. In some implementations, the keys, certificates, and/or tokens can be managed by a certificate authority (CA). In some implementations, the applications 212 include computer-executable instructions to verify that a particular asset is authentic (e.g., previously registered, previously onboarded), the server (e.g., a simulated telematics server 110) is legitimate, and the data in API messages 110*b* has not been tampered with. In some implementations, the applications 212 are structured to provide access controls, which can restrict access to particular types of information (e.g., subsets of API messages 110*b* and/or items in API messages 110*b*). The access controls can be role-based, organization-specific, asset type-specific, asset-specific, deployment-specific, user group-specific and/or user-specific. The applications 212 can be delivered in a secure environment, such as via an intranet associated with a particular OEM. In some implementations, traffic to and from the applications 212 is routed via a secure communications protocol, such as TSL/SSL, https, and so forth.

The data layer 220 can include various engines and/or data stores that enable data services and/or data access. Generally, various engines at the data layer 220 execute operations that organize, manage, share, compute, and/or enhance various data items, such as sensor data, configuration data, API message items, organization data, asset data and so forth (including synthetic data), which are stored in the data store(s) 232. The engines can include executables that enable data generation, processing, analytics, storage, retrieval, and/or visualization. The data store(s) 232 can be implemented in various suitable forms, such as local file systems, network file systems (NFS), database management systems (DBMS), relational DBMS, database file systems (DBFS), distributed ledgers, and so forth. Units of data in the data store(s) 232 can be stored in various forms, such as files (e.g., .xml, .json), database tables, and/or distributed ledger blocks. As such, the data store(s) 232 can utilize various data storage techniques, including file storage, object storage, content-addressed storage, and/or block storage.

As shown, example engines at the data layer 220 can include a scheduler engine 222, a dataset cloner engine 224, an organization management engine 226, an asset management engine 228, and/or an API message generator engine 230. One of skill will appreciate that the engines and/or components thereof can be combined and/or omitted, according to various implementations.

The scheduler engine 222 enables computer-based simulations using test data items and data stores. The simulations can be performed according to computer-based scenarios. The scheduler engine 222 can perform various scenario management tasks, including scenario generation, scenario scheduling, and/or scenario cleanup. The scheduler engine 222 can also perform scenario execution operations, including trigger monitoring, rule execution, fetching scenarios that match particular rules, generation and/or verification of asset IoT certificates, generation of API messages, transmittal of API messages, updates of statuses and operating parameters of virtual assets, and so forth.

Figure 3A:
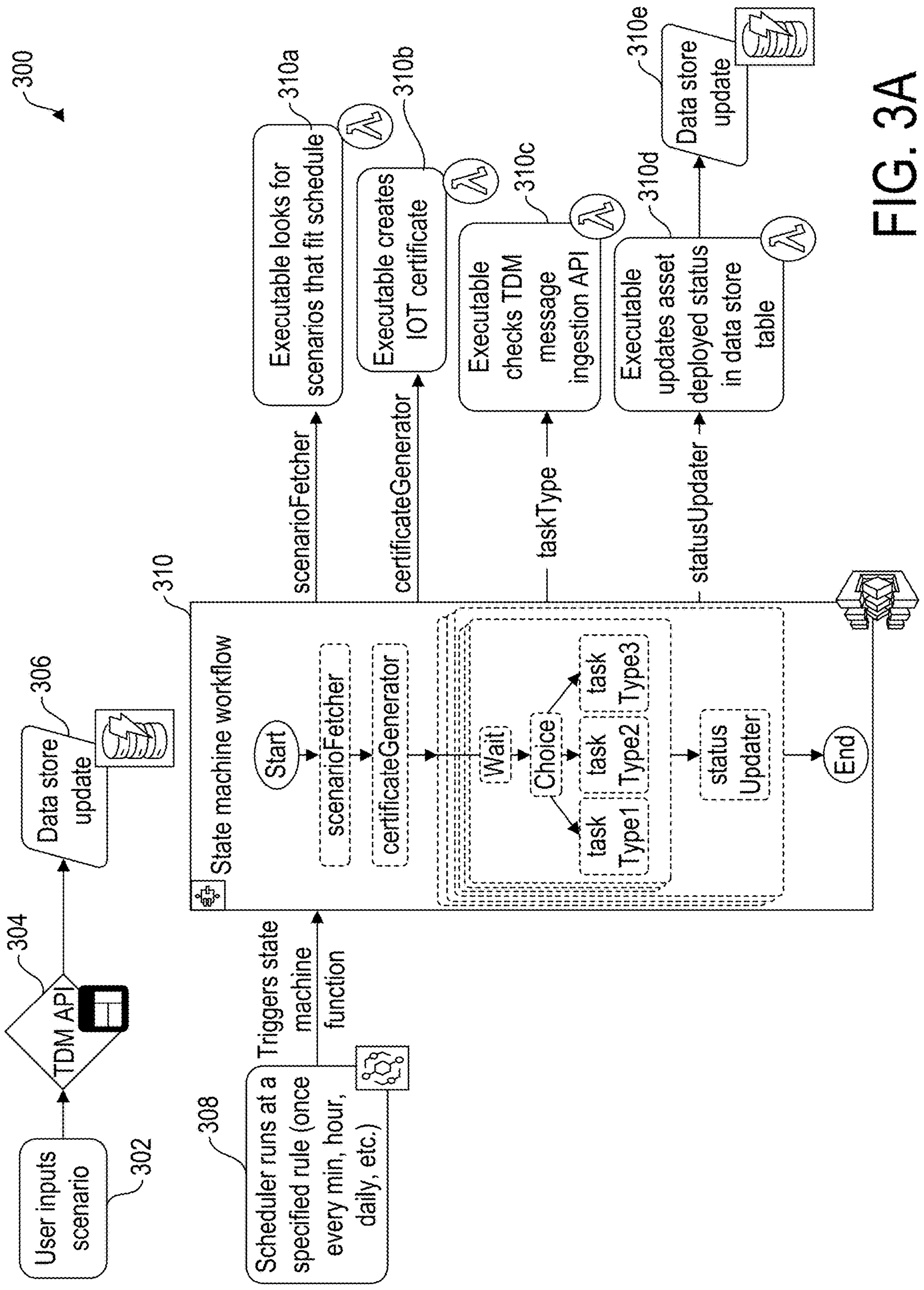
FIG. 3A shows an example architecture of a scenario scheduler engine of the virtual fleet and asset modeling platform.
Figure 3B:
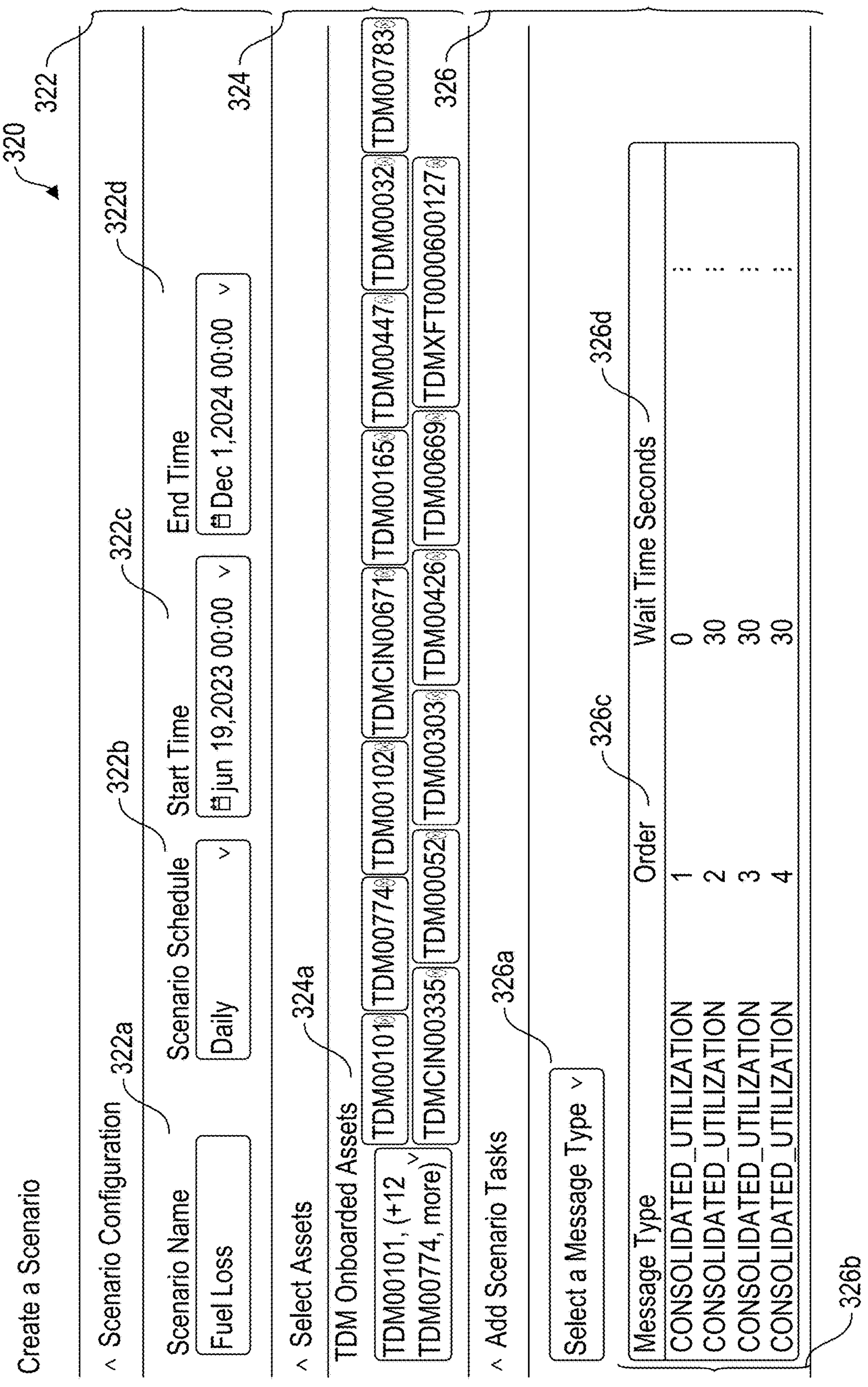
FIG. 3B shows an example GUI for generating a modeling and simulation scenario using the scenario scheduler engine.
Figure 3C:
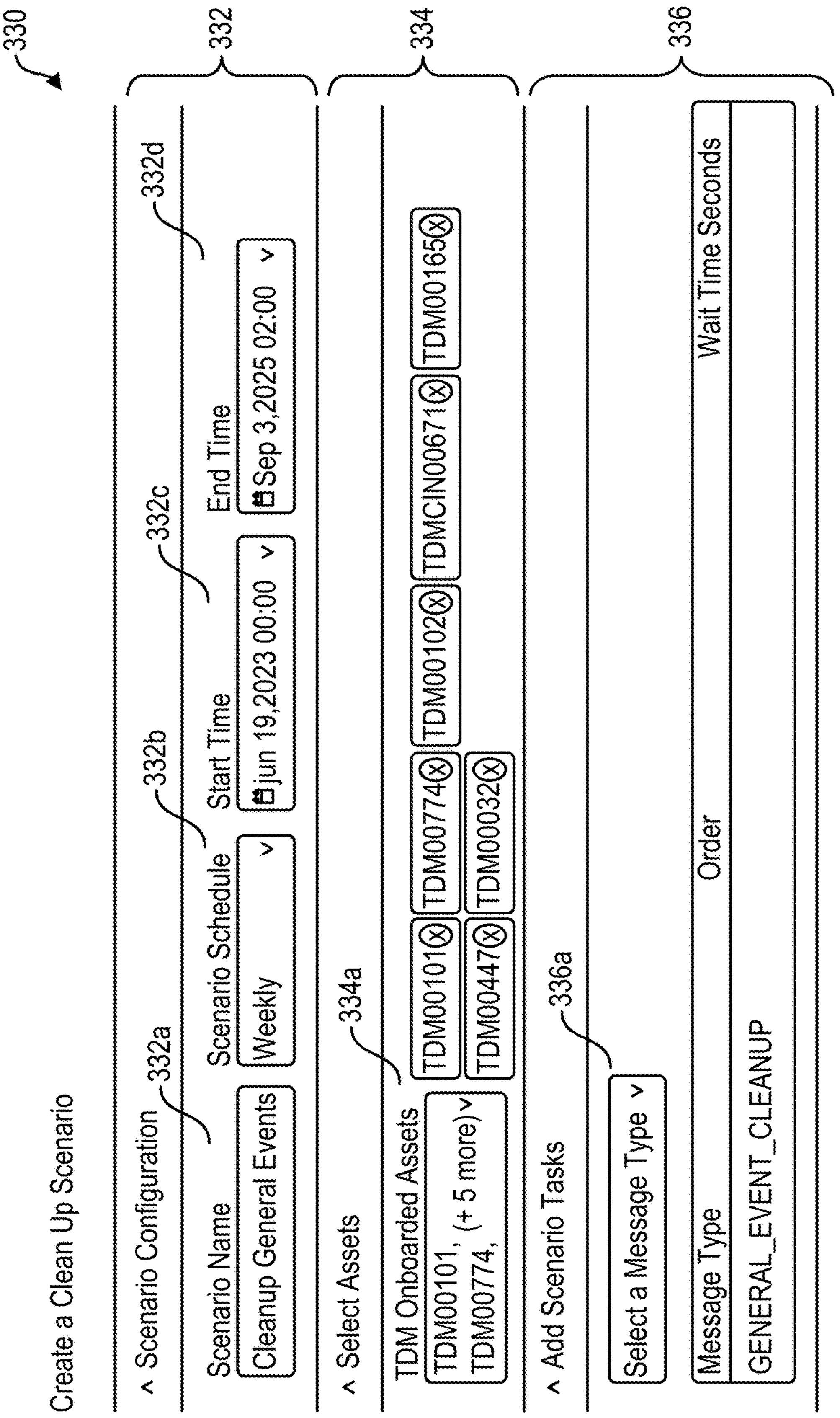
FIG. 3C shows an example GUI for a modeling and simulation clean-up scenario using the scenario scheduler engine.

In some implementations, the scheduler engine 222 is associated with a particular application 212 that enables users to utilize the scheduler engine 222, as discussed in relation to FIGS. 3A-3C. In some implementations, the scheduler engine 222 invokes executables associated with other applications 212 (e.g., applications under test). In such implementations, the applications 212 can simulate operations of the target computing system 120 of FIG. 1.

The scheduler engine 222 can also include executables associated with the API message generator engine 230 to generate test API messages according to user-specified parameters. The test API messages can simulate the structure of API messages 110*b* of FIG. 1 and can include simulation data, including sensor data, test data, and/or synthetic data (e.g., combined sensor data, combined test data, combined sensor and test data). One of skill will appreciate that the test API messages generated by the API message generator engine 230 can include any data element of the API messages 110*b* of FIG. 1.

According to an example use case, FIG. 2B shows a GUI 250 for an API message structured to simulate operations of the telematics ecosystem 100 of FIG. 1. The API message collection 252 can include header records for various types of simulated API messages. The simulated API messages can be generated to include URLs that point to API endpoints accessible to the test applications 212. The simulated API messages can include executable commands, such as post, get, put, patch, and/or delete. The simulated API messages can further include parameters for the executable commands, which can be characterized by a parameter name 256*a* and a parameter description 256*b*.

The API message generator engine 230 can generate unique identifiers for the simulated API messages, and the unique identifiers can be used to track sequences of operations performed throughout the stack of the TDM system 200 for a particular simulated API message (e.g., request/response items). In some implementations, the API message identifiers include device identifiers. The simulated API messages can further include a request body 258, where the user can specify the format 258*a* according to which an API message should be generated (e.g., application-native, .json, .xml). The request body 258 can further include parameter values 258*b*. The parameter values 258*b* can include simulated sensor (102*a*, 102*b*) readings and/or synthetic sensor readings that combine more than one type of sensor data and/or more than one data point. One of skill will appreciate that any type of API messages and their corresponding sensor values, described in relation to FIG. 1, can be simulated using the API message generator engine 230 as described herein. According to various embodiments, the sensor values can be hard-coded, generated on-demand, and/or stored in a look-up table accessible to the API message generator engine 230 at runtime to construct a particular API message and populate its parameter values 258*b*.

According to an example use case of FIG. 2B, a simulated API message of the GUI 250 simulates an asset utilization message, which can include items such as a device identifier, a trigger for the message, point-in-time total operating hours, and point-in-time location data. Some items in the asset utilization message are synthetic items that combine multiple input values and/or can be roll-ups of values, such as the point-in-time cumulative values (e.g., total operating hours), averages, and so forth.

The organization management engine 226 of the data layer 220 enables users to generate virtual organizations for testing applications 212. For example, virtual organizations can be generated to isolate a particular fleet (group of assets) in order to preserve security of test data, to account to variability in data processing rules, and so forth. A particular virtual organization record can represent an OEM, a customer, a group of assets (e.g., a homogenous or mixed-asset fleet), an asset type for a customer, a group of assets deployed in a particular geographical location, a group of asset deployed to a particular project, and so forth. FIG. 2C shows an example GUI 260 for generating a virtual organization using the organization management engine 226. A particular virtual organization record can include various identifiers, such as identity (262, 268), location 264, contact information 266, and so forth.

The asset management engine 228 of the data layer 220 enables users to generate asset records for testing applications 212. FIG. 2D shows an example GUI 270 for generating a virtual asset. For example, users can define configuration parameters for virtual asset records (e.g., items 271-279) of FIG. 2D. Assets can be associated with virtual organizations 271*a*, forming one-to-many organization-to-asset relationships.

Assets can include various attributes, which can be utilized for scenario scheduling operations and/or API message generation operations. For example, assets can include device details 272, which can specify items such as make, commercial type, device type, radio type and/or radio components, device status, hardware part identifiers, software part identifiers, and so forth.

Assets can be associated with various subscription records 274*b*. Subscription records 274*b* can define the content of API messages transmitted by the devices, periodicity of the API messages, targets for the API messages, and so forth. In some implementations, subscription records 274*b* can be used to simulate, at least in part, the logic of controllers (102*b*, 104*b*) to cause the controllers to collect data from specific sensors (102*a*, 104*a*) at specific time intervals and/or when specific operating conditions are met. For example, a particular controller (102*b*, 104*b*) can cause engine-out exhaust temperature sensors to provide readings when the engine of a particular asset operates over a predetermined revolutions-per-minute (rpm) threshold. More generally, the simulated operating conditions can relate to detection of environmental conditions (e.g., air temperature), location data (e.g., detecting that the asset is within a particular geofence), proximity data (e.g., detecting an obstacle within a predetermined distance from the asset), or any other suitable trigger for actuating particular sensors and/or analyzing data in a particular way. For instance, detecting that an object is less than 10 meters away from an asset can cause the simulated controller (102*b*, 104*b*) to collect multi-axial translational movement data (surge, heave, sway) and multi-axial rotational movement data (roll, pitch, yaw) for a particular attachment, such as an arm attachment, from specific sensors (102*a*, 104*a*) mounted thereon.

Figure 2F:
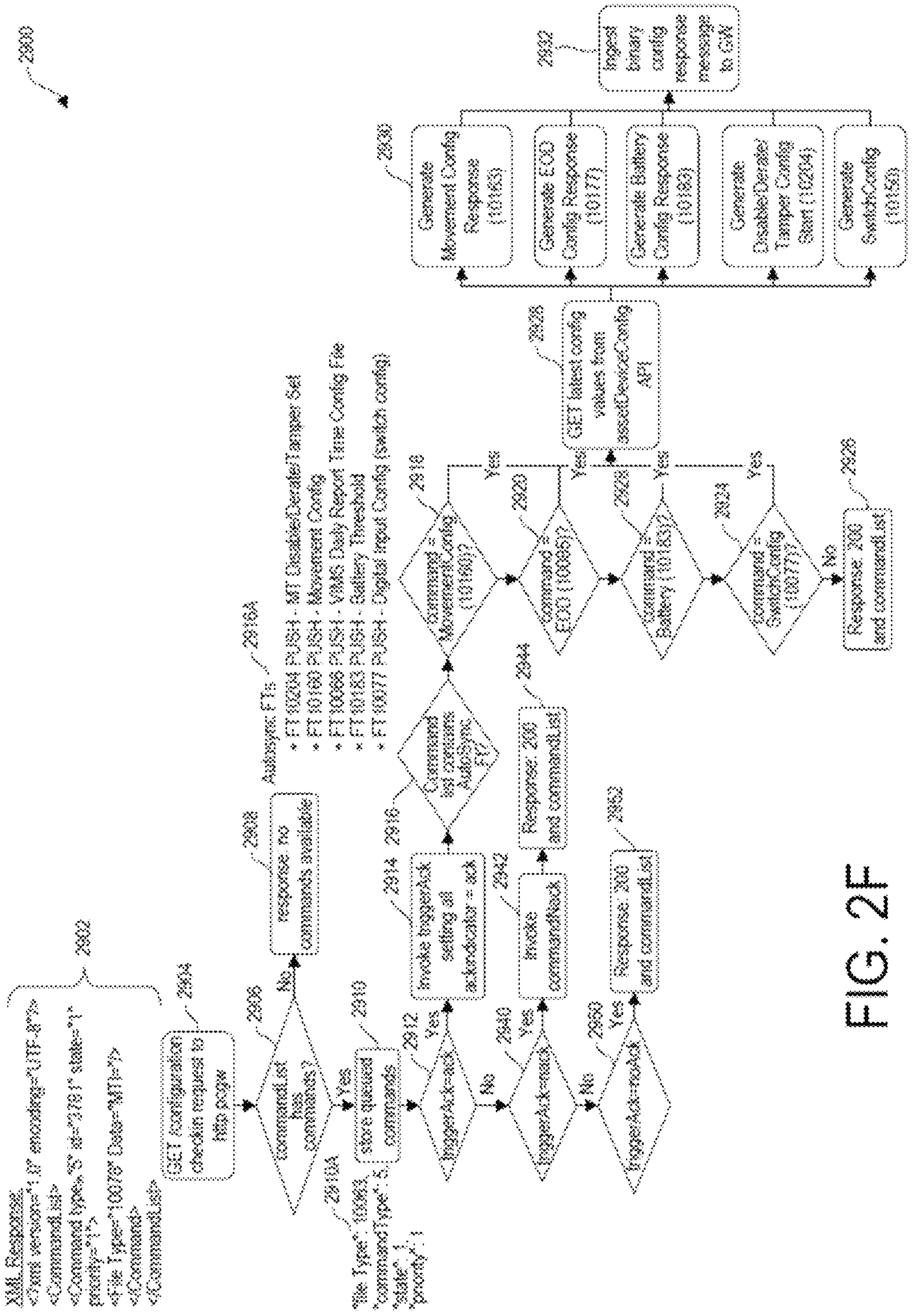
FIG. 2F shows an example flow for virtual asset messaging, using the system of FIG. 2A, to simulate operations of the telematics ecosystem of FIG. 1.

FIG. 2E shows an example GUI 280 for checking in a virtual asset, which enables a particular virtual asset to generate, send and/or receive simulated electronic messages 110*b*. FIG. 2F shows an example flow 2900 for virtual asset messaging that enables assets to auto-sync their status.

As shown in FIG. 2E, a particular asset can be identified by a unique identifier (282*a*, 282*b*). The user can specify a particular API gateway 282*d* in the TDM environment, thereby simulating a particular web server 110*d*. The user can also specify the check-in type of the asset (i.e. whether the simulated entity should send positive or negative acknowledgment messages in response to receiving electronic messages) and auto-sync status. As shown in FIG. 2F, if the auto-sync status for a particular virtual asset is enabled, the platform can orchestrate a series of calls to invoke executables to execute the flow 2900.

At 2904, the platform can obtain a command list 2902 for the asset in a test environment. If, at 2906, it is determined that the command list 2902 is an empty set, then, at 2908, the process terminates such that no further executables are invoked. If, at 2906, it is determined that commands exist in the set, then, at 2910, the commands are queued up (e.g., stored, using a data structure 2910*a*) for execution. In some implementations, particular commands can be represented by files of specific file types that uniquely identify the commands. The command files can contain executables to invoke command-related operations. In some implementations, the commands can be asset configuration commands.

For the commands queued up for execution, the platform can go through a series of logic controls (2912, 2940, and/or 2950) that evaluate acknowledgement settings for the asset. For instance, if, at 2912, it is determined that the acknowledgement setting is "ack" (acknowledge all), then, at 2914, a trigger invokes decision logic 2916. If, at 2916, it is determined that the command list contains parameters that denote auto-sync commands 2916*a*, then, at 2918-2924, the specific commands (denoted by the file types) are evaluated and, at 2928, calls are generated to an asset configuration API to perform specific configuration tasks 2930 as specified by the commands. The configuration tasks 2930 can include executable instructions to generate specific configuration messages, such as movement-related configuration messages, end-of-day routine configuration messages, battery-related configuration messages, disable/derate/tamper-related configuration messages, and/or other configuration messages. At 2932, responses to these configuration messages are simulated via the API gateway 282*d*.

The flow 2900 enables automation of a series of actions that simulate what a real asset would have performed. For instance, according to an example use case, an asset can be configured (at 2916*a*) to report its daily telematics at midnight UTC (referred to as "End Of Day" or "EOD"). An application user may want to change the configuration on the asset to report daily at 8:00 PM. The user can initiate a command to the asset to change its "EOD" configuration. The asset can check in (at 2904) and receive (at 2928) the appropriate configuration update. The asset can acknowledge that has received the command, update its on-board configuration to send data at 8:00 PM, and send a configuration response message (at 2930) to the API gateway 282*d*. The response, ingested at the API gateway 282*d* (at 2932) can contain an indication of an updated EOD configuration with an updated value of 8:00 PM.

In some implementations, virtual assets can automatically check in and auto-sync their configuration settings when the assets are under test (e.g., prior to or as part of executing a particular test scenario). For example, a process for testing a set of virtual assets can include, for at least one asset in the set of virtual assets, generating a simulated API message definition structured to capture, according to a configuration setting, a set of simulated sensor values. A scheduler, described in more detail further herein, can execute, at a predetermined time, a set of operations for at least one asset in the set of virtual assets. The operations can include causing the asset to automatically update at least one particular configuration setting for the asset as described in relation to FIG. 2F. The configuration setting can relate to a particular set of simulated sensors or sensor values (e.g., battery-related data, engine-related data, transmission-related data, attachment-related data, movement-related data, tampering-related data and so forth). Using a set of simulated sensor values specified by the updated configuration setting, the platform can generate a simulated API message according to the API message definition.

The dataset cloner engine 224 enables cloning (e.g., copying, duplicating in substantial part) various items in the data store 232, including virtual organization records, virtual asset records, simulated API messages and/or scenario data (scenario definitions, scenario scheduling, scenario-to-asset maps and so forth). The dataset cloner engine 224 can include one or more of a parametrized function, a parametrized executable, a GUI, a chatbot, or have another suitable interface that allows the user to specify the unique identifier of the entity to clone. The unique identifiers can include, for example, virtual organization identifiers, virtual asset identifiers, API message identifiers, and/or scenario identifiers. In some implementations, after cloning a particular entity, the user is enabled to navigate to a GUI (e.g., any of the GUIs shown herein) populated with data for the newly created entity, where the data can be edited.

Scenario Scheduler Engine

FIG. 3A shows an example architecture 300 of a scenario scheduler engine 222 of the TDM system 200 of FIG. 2A. The scenario scheduler engine enables users to generate modeling and simulation scenarios. To that end, FIG. 3B shows an example GUI 320 for generating a modeling and simulation scenario, and FIG. 3C shows an example GUI 330 for generating a clean-up scenario. One of skill will appreciate that the scenario scheduler engine 222 can, via the architecture 300 or a functionally similar architecture, simulate any entities and/or operations described with respect to FIG. 1, including fleet, assets, servers (e.g., telematics server), target systems (e.g., as applications under test), and API messages.

At 302, a user (e.g., software developer, software tester) is enabled to specify (e.g., via a GUI) parameters for generating a scenario. For example, as shown in FIG. 3B, the system can enable the entry of scenario configuration parameters 322, asset information 324, and scenario tasks 326. As shown, scenario configuration parameters 322 can include a scenario name 322*a*, a schedule 322*b* (e.g., daily, weekly, monthly, and so forth), start date/time 322*c*, and end date/time 322*d*. The asset information 324 section binds the assets to a particular scenario record and can include previously onboarded virtual assets. In some implementations, users are enabled to bind a particular virtual organization to a scenario instead of or in addition to adding assets one by one. The scenario tasks can include a set of tasks, which can be performed according to a task sequence 326*b*. The task sequence 326*b* can include tasks for generating specific API messages according to a message type 326*a* (e.g., for API message definitions of FIG. 2B). The generated messages can include simulated sensor values. The task sequence can be executed via the TDM API 304, which can use configuration information 306.

The task sequence 326*b* can include various logic controls for sequencing and timing of tasks, including task order 326*c* and/or wait time 326*d* before or after executing a task. The tasks sequence 326*b* can include a single API message, multiple API messages of the same type, and/or a mix of API messages of different types. As shown in FIG. 3C, the task sequence 326*b* can include clean-up tasks 336*a* for particular assets. The clean-up tasks can clear sets of simulated virtual assets, reset sensor values, reset virtual asset properties and so forth.

The task sequence 326*b* can be performed for the assets listed in asset information 324. In some implementations, the system can check asset properties, such as the device check-in properties of FIG. 2E, to determine whether API tasks in the task sequence 326*b* should be modified or if a particular asset should respond to API message requests in a particular way. For example, if the check-in type is "nack", the asset can return an error message instead or in addition to generating and transmitting the specified API messages.

At 308, the scenario scheduler engine 222 determines, using scenario schedules 322*b* across a set of scenarios in a data store (e.g., all scenarios, scenarios associated with a particular virtual organization or fleet), a set of scenario identifiers for scenarios that should be executed. To that end, the scenario scheduler engine 222 can periodically execute operations using a time-parametrized executable process, such as a cron job. The cron job can return a list of scenario identifiers for scenarios to execute. For each determined scenario identifier (sequentially or in parallel), a state machine 310 can be activated (i.e., the state machine 310 can determine that a trigger condition to execute its operations in met when the cron job returns a non-empty set of scenario identifiers). The state machine 310 fetches (310*a*) the scenario, generates (310*b*) an IoT certificate, and executes (310*c*) the series of tasks defined in the task sequence 326*b* for the corresponding scenario. Upon execution, the state machine 310 can generate (310*d*) log data and update (310*e*) asset information in the appropriate data store(s).

Asset Signal Monitoring Engine and Visualizer

The asset management engine 228 of FIG. 2A can include an asset signal monitoring engine 228*a* and/or an asset signal visualizer 228*b*. In operation, the TDM system 200 can generate various simulated messages, such as system messages, API messages, sensor signals, synthetic sensor values, and so forth. The asset signal monitoring engine 228*a* can ingest the generated signals in various forms, such as, for example, by accessing, receiving or intercepting one or more API messages. The asset signal monitoring engine 228*a* enables various functions that facilitate monitoring of the signals. These functions can include, for example, parsing of API messages, computer-based modeling and/or calculations of system performance parameters (e.g., latency, throughput, processor usage, memory usage, file size, query optimization metrics, and so forth) using various properties of the signals, and/or generating computer-based, user-interactive visualizations of the signals via the asset signal visualizer 228*b*.

Figure 3D:
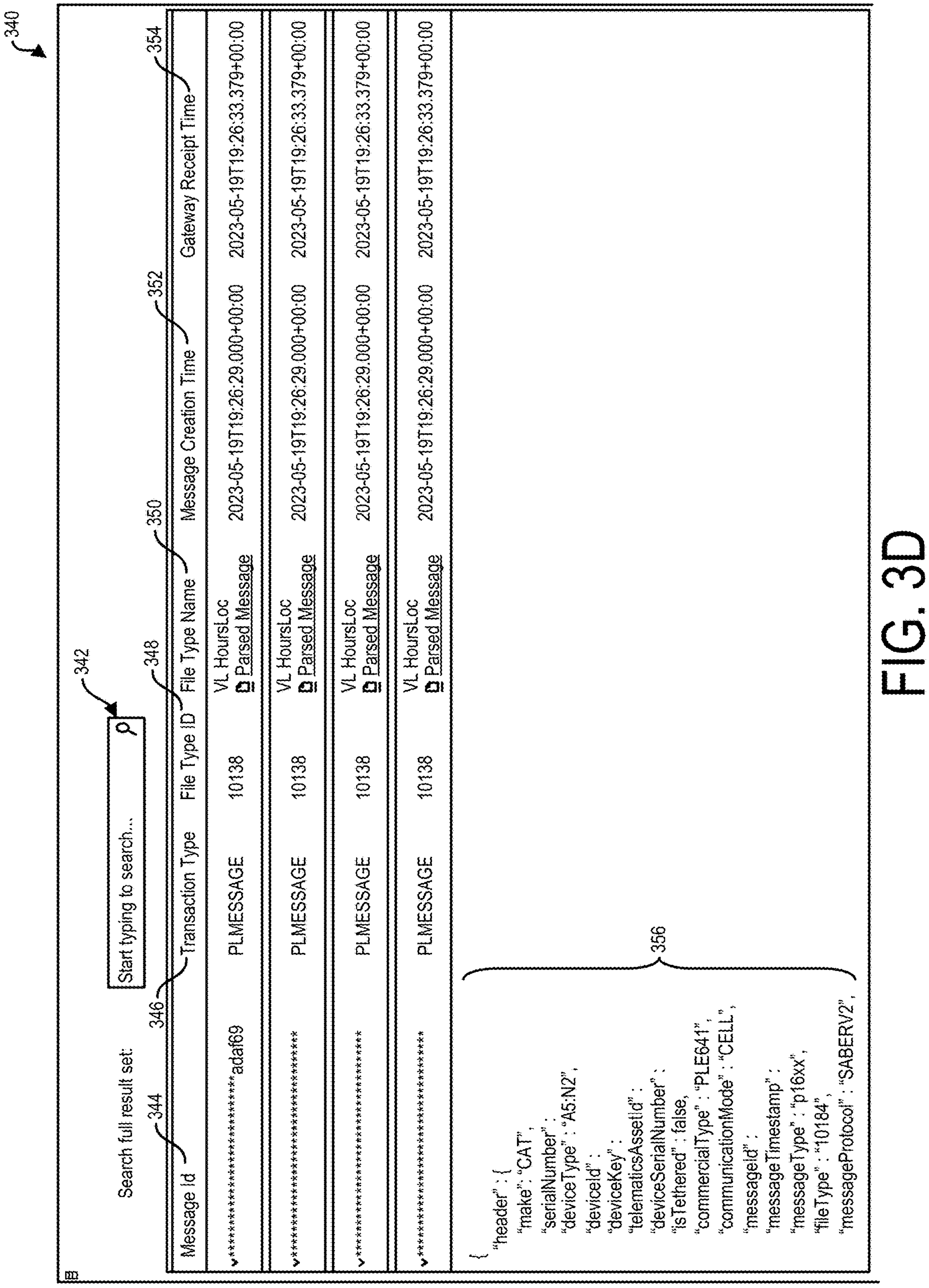
FIG. 3D shows an example GUI for bulk parsing and searching virtual asset signals using the virtual fleet and asset modeling platform.
Figure 3E:
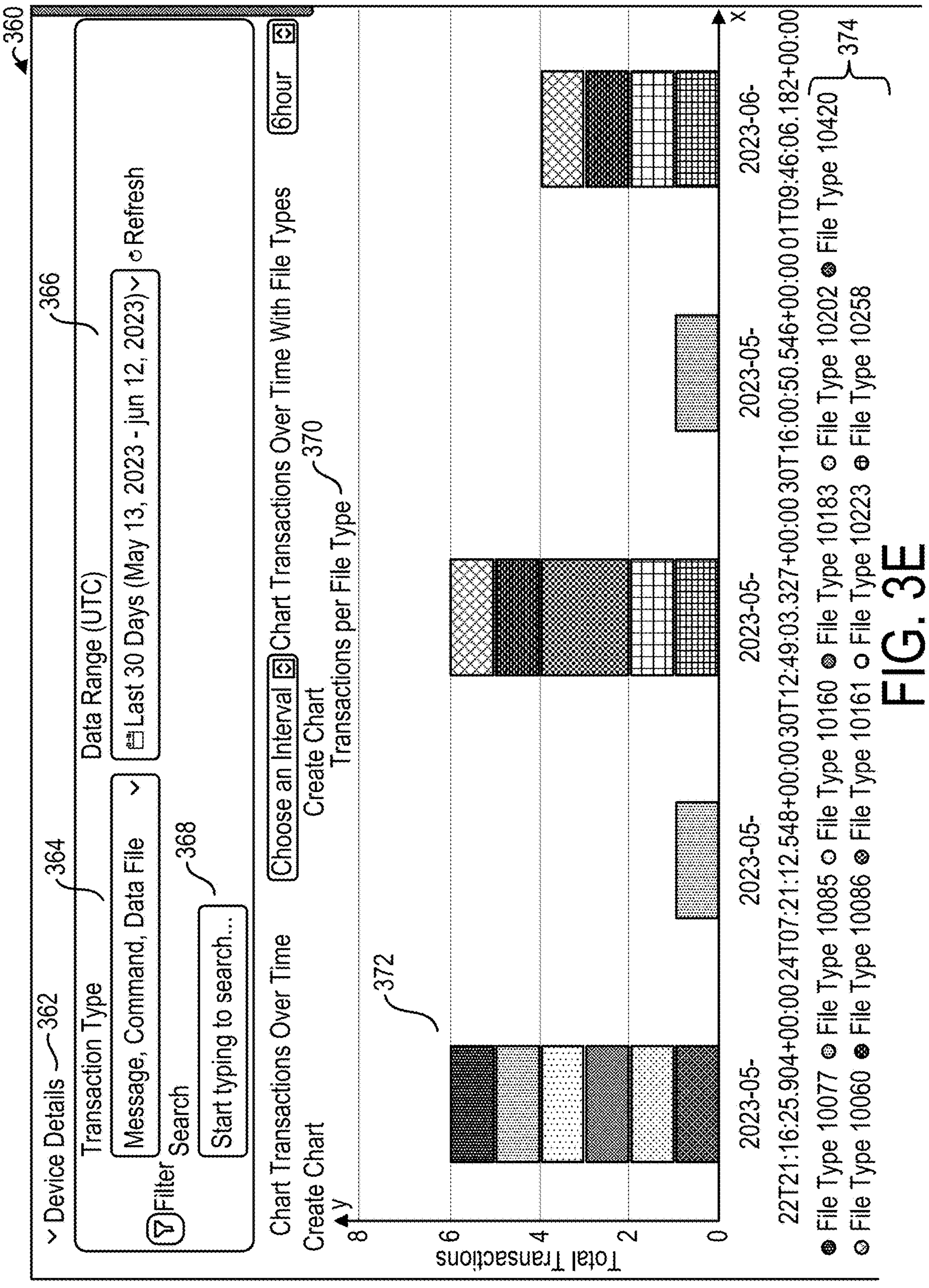
FIG. 3E shows an example GUI for visualizing throughput of virtual asset signals using the virtual fleet and asset modeling platform.
Figure 3F:
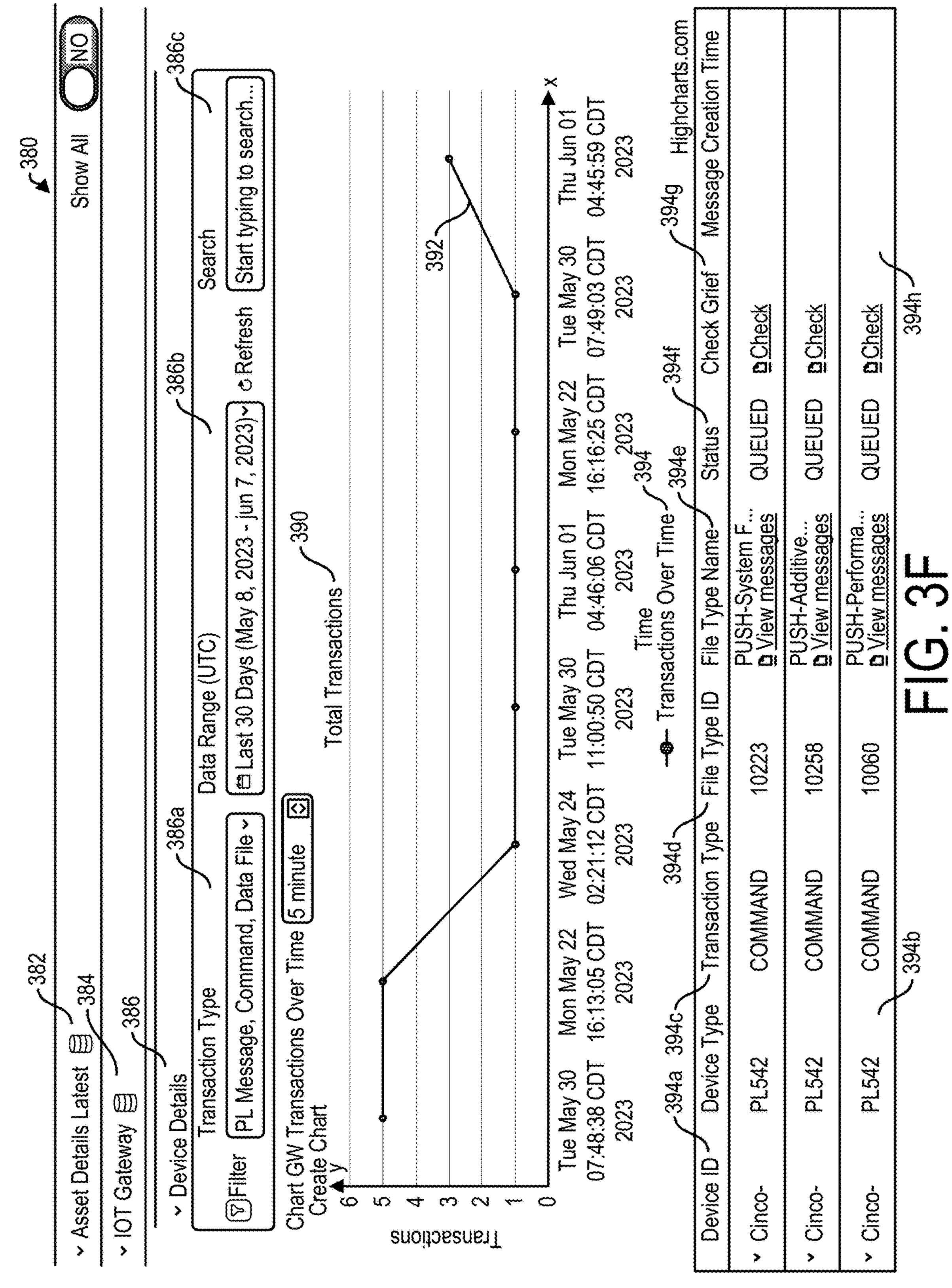
FIG. 3F shows an example GUI for visualizing signal throughput over time using the virtual fleet and asset modeling platform.

FIG. 3D shows an example GUI 340 for bulk parsing and searching asset signals, and FIGS. 3E and 3F show various example signal aggregations generated using the parsed items. The asset signals can include any of the signals generated by various entities in the ecosystem of FIG. 1, including production asset signals, test asset signals and/or simulated virtual asset signals. The entities can include, for example, one or more of a telematics server 110, asset (102, 104), sensor (102*a*, 104*a*), controller (102*b*, 104*b*), target system 120*a*, interface engine 112, and so forth. The telematics server 110 (e.g., the endpoint 102*c*) can conceptually represent one or more system integration points, such as, for example, one or more of gateways, application routers, consolidated data stores (e.g., databases, data warehouses), asset utilization data stores, maintenance data stores, troubleshooting data stores, dealer information systems, OEM information systems, and so forth. A particular signal can flow, via a communication channel, through two or more integration points in any suitable combination thereof.

As shown, the GUI 340 enables visualization of various aspects/properties of a particular signal. The properties can include a message id 244, a transaction type 346, a file type 348, a file type name 350, a message creation timestamp 352, a gateway receipt timestamp 354, a message body 356, and so forth. The message creation timestamp 352 can include a datetime value that corresponds to a time transmission of the signal was initiated from the source system. The gateway receipt timestamp 354 can include a datetime value that corresponds to a time the signal was received at a particular gateway. The term "gateway" refers to a signal consolidation and/or routing entity, such as an API gateway, internet-of-things (IoT gateway), application router (e.g., signal consolidation and/or routing entity associated with a particular target application), and so forth.

The system can automatically generate various system-related metrics using various signal properties, which can be visualized via the GUI. For instance, the timestamps can be used to automatically determine a system latency value by calculating a difference in time (e.g., 1 millisecond, 10 milliseconds) between a particular signal origination timestamp and a particular signal arrival timestamp. As another example, signal properties, such as message size, device type, transaction type, file type, can be used to automatically determine computing resource usage, such as processor usage and/or memory usage.

The system can generate aggregations of these values (e.g., maxima, minima, summaries, averages, percentiles, classifications, standard deviation measures). The items can be aggregated using, as a grouping label, a suitable parsed signal property or a synthetic value derived therefrom, including device identifiers, device types, virtual organization identifiers, message types, file types, time windows, and so forth. For example, FIG. 3E shows an example GUI 360 for visualizing, via an aggregation visualization 370, channel throughput by file type 374, where a particular channel is a communication channel between any two integration points and includes suitable hardware components described herein. As shown, parameters for the aggregation visualization 370 of FIG. 3E can be tuned by specifying time intervals, datetime ranges, transaction types, or other parameters.

As another example, FIG. 3F shows an example GUI 380 for visualizing signal throughput 390 over time. As shown, the GUI 380 can include a first section structured to display a level-one (L1) visualization 392 of an aggregation, such as a sum of signal throughput 390 values (transaction counts) plotted over time. The GUI 380 can further include a second section structured to display a level-two (L2) visualization 394 of a detail view that displays various signal properties for a particular aggregation. In some implementations, the L2 visualization 394 can be updated to include signal subsets that correspond to a user interaction with the L1 visualization 392. For example, if a user selects a particular point on the L1 visualization 392, the corresponding signal subset can be determined for display via the L2 visualization 394. L2 visualizations 394 can further include hyperlinks 394*g* to various additional systems or data stores, such as asset maintenance stores. A particular hyperlink 394*g* can include an asset identifier.

According to various embodiments, parameters for visualizations are further tunable via the GUIs. For example, input items (342, 364, 366, 368, 386) can be used to receive user-specified parameters for filtering signals to generate subsets included in visualizations. In some implementations, the parameters can correspond to specific signal attributes/properties. In some implementations, the parameters can be selected from a pre-populated list of values or entered as free text. The range of available parameters or allowable return values can be restricted according to a user security role, group membership, virtual organization associated with an asset, and so forth.

Methods of System Operation for Virtual Fleet and Asset Modeling

Figure 4A:
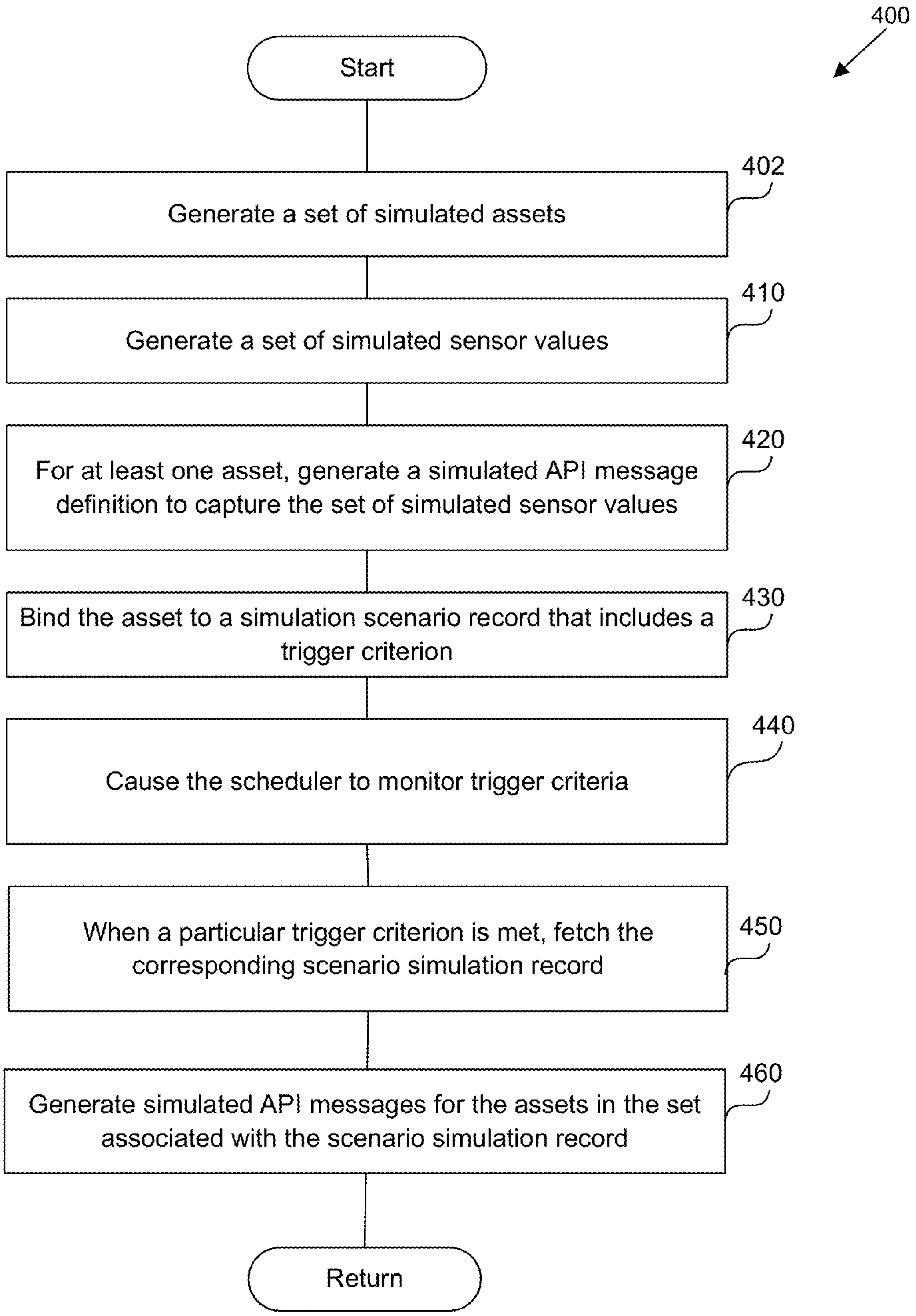
FIG. 4A is a flowchart of a method for virtual fleet and asset modeling using the TDM system of FIG. 2A.

FIG. 4A is a flowchart of a method for virtual fleet and asset modeling using the TDM system of FIG. 2A and/or the scenario scheduler of FIG. 3A. A hardware or software processor executing instructions described in this application can perform the operations described herein. One of skill will appreciate that certain operations can be omitted, combined, and/or substituted without departing from the spirit of the invention.

As shown, at operations 402, a set of simulated assets (e.g., virtual assets) is generated. The operations can include associating a particular virtual asset with a particular virtual organization, defining properties of virtual assets, onboarding virtual assets, checking in virtual assets, and so forth.

At operations 410, a set of virtual sensor values is generated for the corresponding assets. The values can include or approximate raw data received by machinery and/or can be synthetic values generated based on raw data. In some implementations, the sensor values are generated prior to performing operations that follow (i.e. prior to using the values in simulated API messages). In some implementations, the sensor values are generated when the API messages are generated by, for example, referencing hard-coded values in API message definitions, referencing look-up tables, obtaining production data values for similar asset types, and so forth.

At operations 420, simulated API message definitions are generated for virtual assets using the simulated sensor values. According to various implementations, operations 402, 410, and 420 can be performed sequentially or in parallel in any suitable order. For example, API message definitions can be generated or imported (cloned) before a particular set of virtual assets is generated or imported (cloned).

At operations 430, a particular simulation scenario record can be generated. The simulation scenario record can be bound to all or some of the virtual assets in the generated set of assets. The simulation scenario record can include trigger conditions, which can be time-based, event-based, and so forth. The simulation scenario record can include one or more tasks that can include API message definitions of the same type (e.g., utilization) or of different types (e.g., utilization, clean-up). For instance, a particular simulated API message in a simulation scenario can be a first simulated API message, and the method can include causing a temporal delay after generating the first simulated API message and prior to generating a second simulated API message, where the temporal delay can be determined based on the simulation scenario record.

At operations 440, trigger conditions are monitored (e.g., via a time-parametrized periodically executable job) by a scheduler engine. When the scheduler engine detects, at operations 450, that trigger conditions are met, the scheduler engine can fetch a simulation scenario record, determine the assets bound to the record, and for each asset, generate, at operations 460, simulated API messages according to message definitions. The messages can be transmitted to target computing systems, such as applications 212 of FIG. 2A, which can simulate various items in the ecosystem 100 of FIG. 1, including the target computing system 120.

Figure 4B:
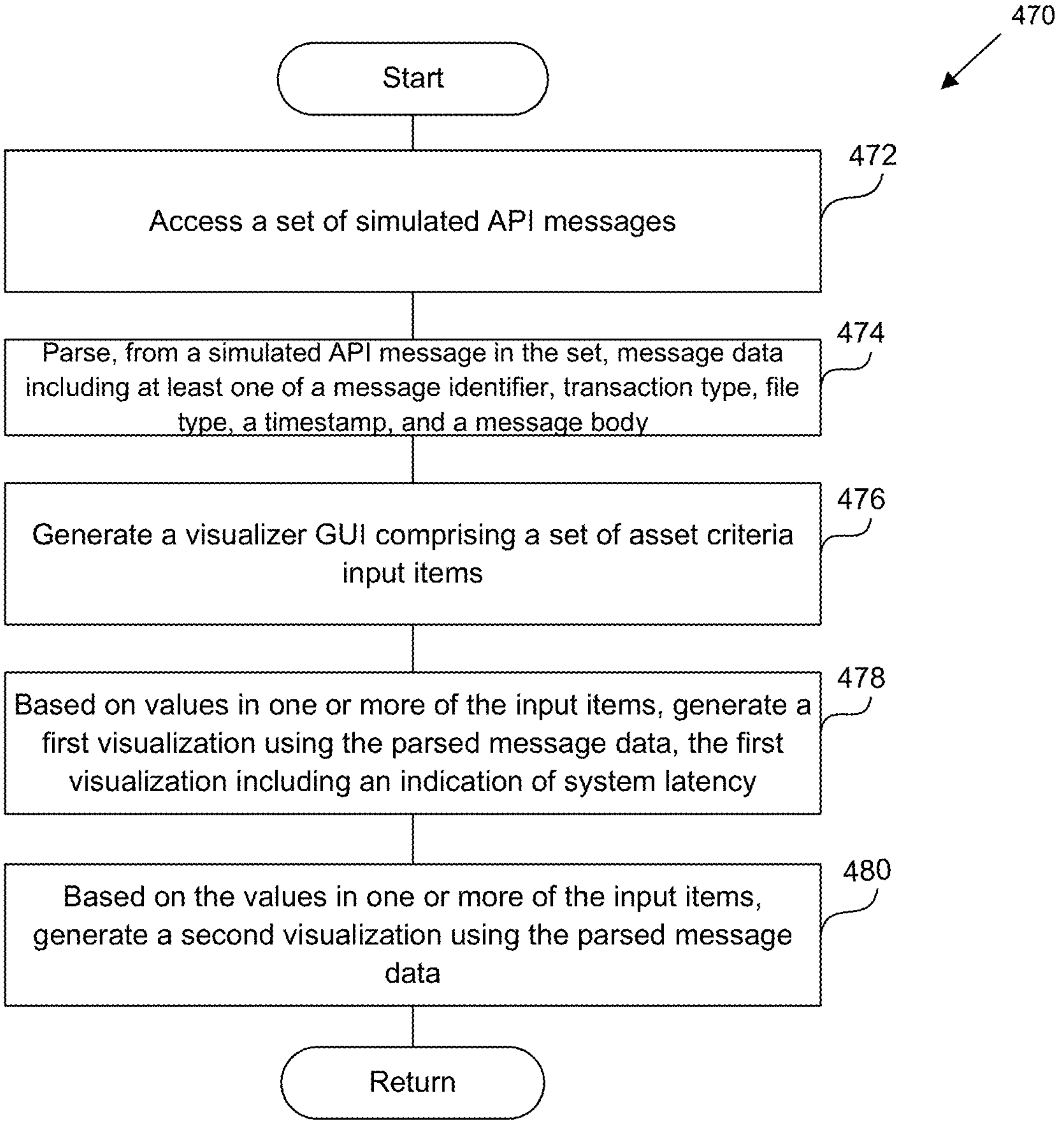
FIG. 4B is a flowchart of a method for enabling asset signal monitoring using simulated API messages for the system of FIG. 2A.

FIG. 4B is a flowchart of a method for enabling asset signal monitoring using simulated API messages for the system of FIG. 2A. A hardware or software processor executing instructions described in this application can perform the operations described herein. One of skill will appreciate that certain operations can be omitted, combined, and/or substituted without departing from the spirit of the invention.

As shown, at operations 472, the platform can generate, receive, retrieve, or otherwise access a set of simulated API messages. At operations 474, the platform can parse, from a particular API message, message data, such as an asset identifier, message identifier, transaction type, file type, timestamp, message body, and so forth. At operations 476, the platform can generate a visualizer GUI that includes one or more input items that allow the user to specify asset criteria. At operations 478, the visualizer GUI can be updated to include a first visualization (e.g., an L1 visualization) generated using the parsed message data. The first visualization can include a summary metric, such as an indication of system latency. At operations 480, the visualizer GUI can be updated to include a second visualization (e.g., an L2 visualization that corresponds to the L1 visualization).

Example Computer Systems and Networks

Figure 5:
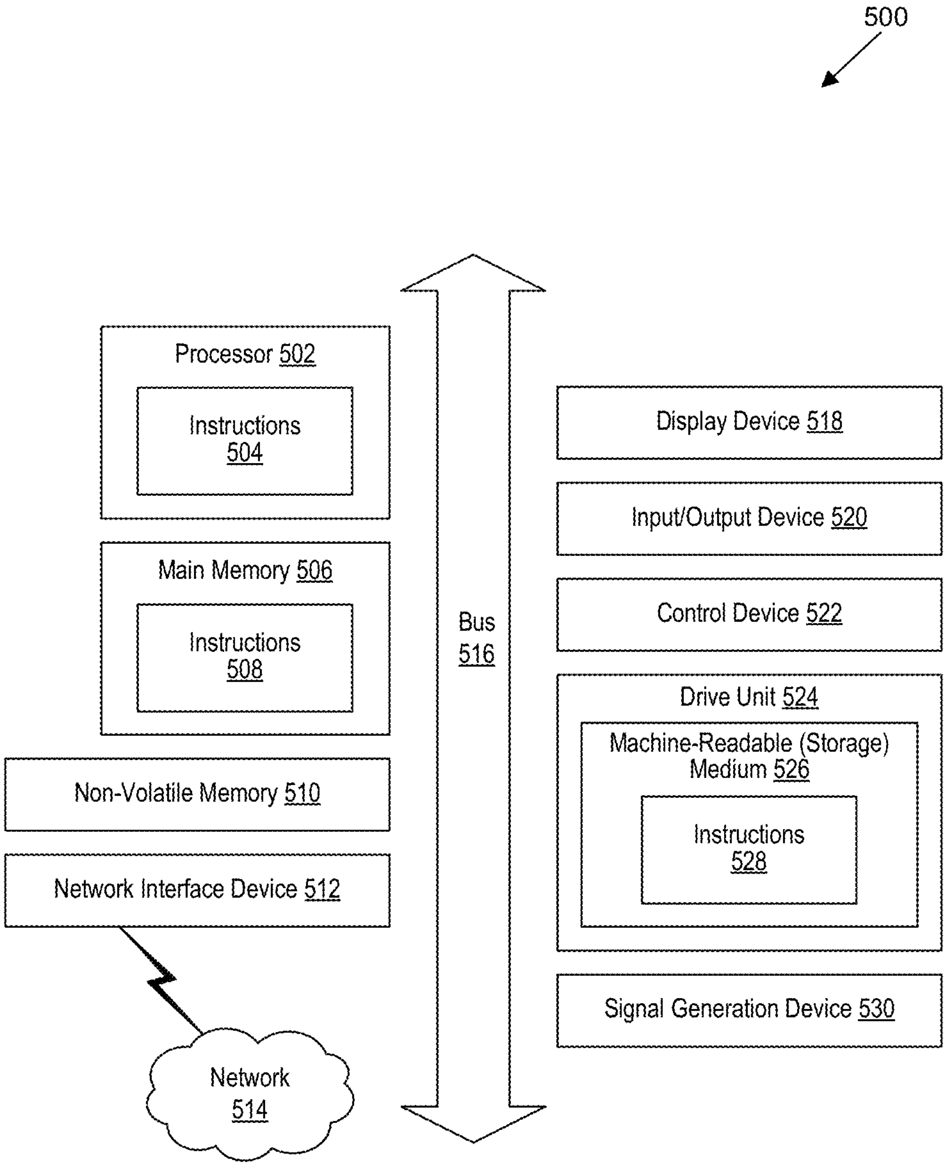
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the Figures and any other components described in this specification can be implemented.

The computer system 500 can take any suitable physical form. For example, the computer system 500 can share a similar architecture as that of a server computer, personal computer (PC), tablet computer, mobile telephone, game console, music player, wearable electronic device, network-connected ("smart") device (e.g., a television or home assistant device), augmented reality/virtual reality (AR/VR) systems (e.g., head-mounted display), or any electronic device capable of executing a set of instructions that specify action(s) to be taken by the computer system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computer system 500 to mediate data in a network 514 with an entity that is external to the computer system 500 through any communication protocol supported by the computer system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computer system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computer system 500 to perform operations to execute elements involving the various aspects of the disclosure.

Figure 6:
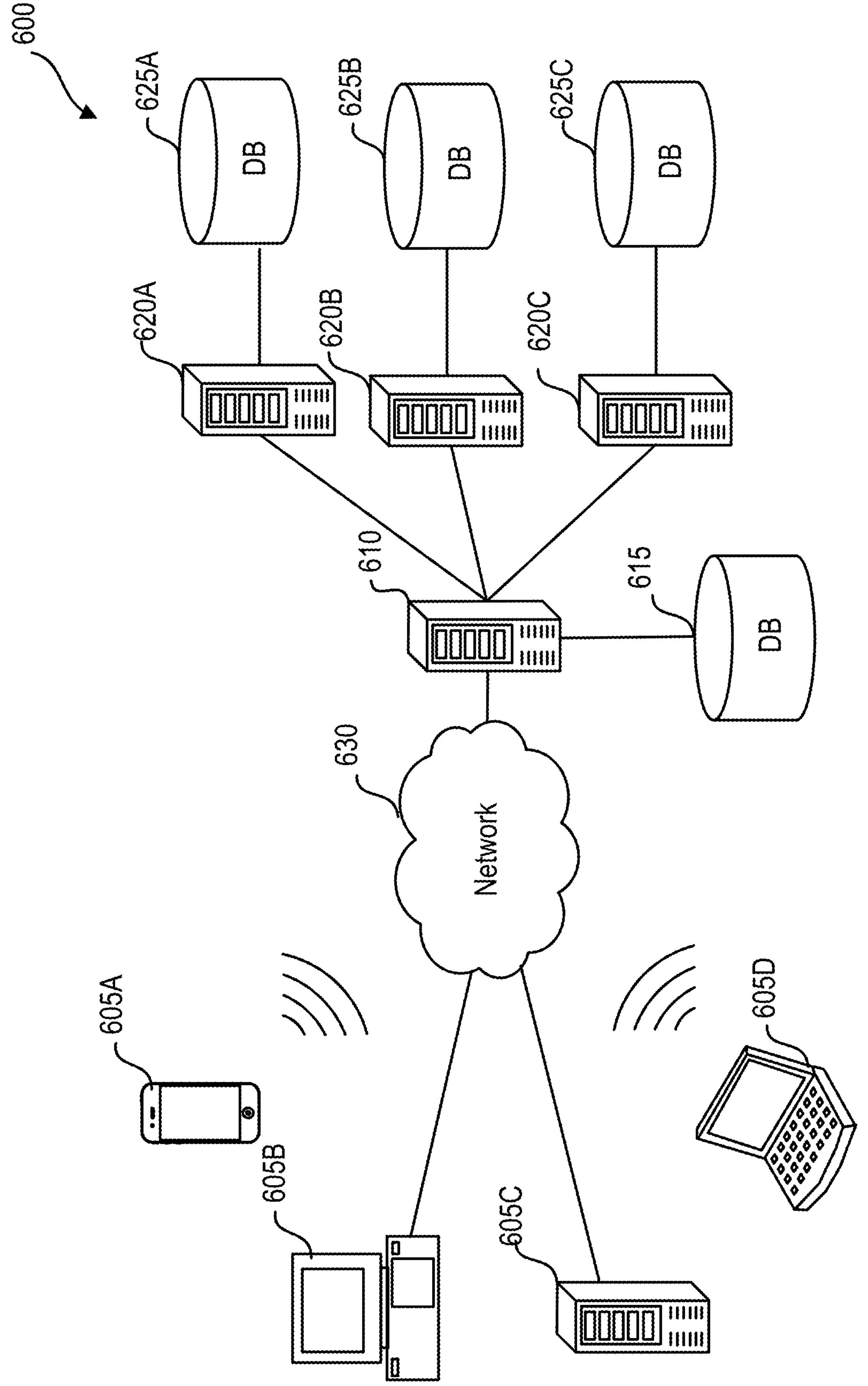
FIG. 6 is a system diagram illustrating an example environment in which the disclosed data analytics and contextualization platform operates in some implementations.

FIG. 6 is a system diagram illustrating an example of a computing environment in which the disclosed data analytics and contextualization platform operates in some implementations. In some implementations, environment 600 includes one or more client computing devices 605A-D, examples of which can host systems described herein. Client computing devices 605 operate in a networked environment using logical connections through network 630 to one or more remote computers, such as a server computing device.

In some implementations, server 610 is an edge server which receives client requests and coordinates fulfillment of those requests through other servers, such as servers 620A-

C. In some implementations, server computing devices 610 and 620 comprise computing systems, such as the target computing system 120 of FIG. 1, TDM system 200 of FIG. 2A, and so forth. Though each server computing device 610 and 620 is displayed logically as a single server, server computing devices can each be a distributed computing environment encompassing multiple computing devices located at the same or at geographically disparate physical locations. In some implementations, each server 620 corresponds to a group of servers.

Client computing devices 605 and server computing devices 610 and 620 can each act as a server or client to other server or client devices. In some implementations, servers (610, 620A-C) connect to a corresponding database (615, 625A-C). As discussed above, each server 620 can correspond to a group of servers, and each of these servers can share a database or can have its own database. Databases 615 and 625 warehouse (e.g., store) information such as scheduler engine data, dataset cloning engine data, organization data, asset data, fleet data, API message generator data and so forth. Though databases 615 and 625 are displayed logically as single units, databases 615 and 625 can each be a distributed computing environment encompassing multiple computing devices, can be located within their corresponding server, or can be located at the same or at geographically disparate physical locations.

Network 630 can be a local area network (LAN) or a wide area network (WAN), but can also be other wired or wireless networks. In some implementations, network 630 is the Internet or some other public or private network. Client computing devices 605 are connected to network 630 through a network interface, such as by wired or wireless communication. While the connections between server 610 and servers 620 are shown as separate connections, these connections can be any kind of local, wide area, wired, or wireless network, including network 630 or a separate public or private network.

INDUSTRIAL APPLICABILITY

The disclosed system enables automatic asset signal monitoring, including, for example, determining system latency metrics for communication channels between various integration points. The integration points can include one or more of an internet-of-things gateway, a telematics server, an application router, a consolidated data store, or an asset utilization data store. The latency metrics can include transaction (e.g., signal, API message, sensor value, synthetic value, a digital representation of an analog signal) counts, maximum system latency values, minimum system latency values, and/or average system latency values. The latency metrics can be associated with signal aggregations, such as, for example, signal aggregations by transaction type, file type, and so forth. Asset signal monitoring can be further enhanced by using user-interactive visualizers, which can present aggregations and/or system latency metrics associatively mapped to the corresponding visualizations of signal subsets.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A computing system for testing of fleet management software, the computing system comprising circuitry provided to an edge controller device configured to transmit data to an API gateway in asset simulations, the computing system comprising at least one processor, at least one memory, and one or more non-transitory computer-readable storage media storing instructions, which, when executed by the at least one processor, cause the computing system to:

generate, by the computing system, a set of virtual assets, wherein the virtual assets are simulations of machinery in a fleet and wherein at least one asset in the set of virtual assets is associated with a set of simulated sensor readings, the set of simulated sensor readings relating to a simulated operating parameter of a particular virtual asset in the set of virtual assets;

cause the circuitry of the edge controller device to generate an electronic message to transmit the simulated sensor readings or a derivative set to the API gateway;

for the at least one asset in the set of virtual assets, cause the API gateway to generate a simulated application programming interface (API) message set structured to capture the set of simulated sensor readings or the derivative set;

for at least one simulated API message in the simulated API message set, parse, from the at least one simulated API message, simulated message data comprising a message creation timestamp associated with simulating the operating parameter at the edge controller device and a gateway receipt timestamp associated with operations of the API gateway;

generate a visualizer comprising a set of input items; and responsive to detecting a user interaction with at least one of the input items, generate a first visualization comprising an aggregation of the simulated message data that correspond to the at least one of the input items, wherein the aggregation comprises an indication of system latency between the edge controller device and the API gateway, and wherein the indication of system latency is based on the message creation timestamp and the gateway receipt timestamp; and generate a second visualization comprising the simulated message data corresponding to the generated aggregation.

2. The system of claim 1, wherein the API gateway comprises an internet-of-things gateway, a telematics server, an application router, a consolidated data store, or an asset utilization data store.

3. The system of claim 1, wherein the aggregation comprises at least one of a transaction count, a maximum system latency value, a minimum system latency value, and an average system latency value.

4. The system of claim 1, the instructions further causing the system to:

access a supplemental dataset for a particular virtual asset; and generate and display, via the second visualization, a hyperlink to a computing system associated with the supplemental dataset, wherein the hyperlink comprises a virtual asset identifier for the particular virtual asset.

5. The system of claim 1, the instructions further causing the system to:

generate a virtual organization associated with a subset of virtual assets in the set of virtual assets; and cause the visualizer to restrict at least one of allowable input items or the simulated API message set to the subset of virtual assets that correspond to the virtual organization.

6. One or more non-transitory computer-readable storage media storing instructions, which, when executed by at least one data processor of a computing system for testing of fleet management software, the computing system comprising circuitry provided to an edge controller device configured to transmit data to an API gateway in asset simulations, cause the computing system to:

generate, by the computing system, a set of virtual assets, wherein the virtual assets are simulations of machinery in a fleet and wherein at least one asset in the set of virtual assets is associated with a set of simulated sensor readings, the set of simulated sensor readings relating to a simulated operating parameter of a particular virtual asset in the set of virtual assets;

cause the circuitry of the edge controller device to generate an electronic message to transmit the simulated sensor readings or a derivative set to the API gateway;

for the at least one asset in the set of virtual assets, cause the API gateway to generate a simulated application programming interface (API) message set structured to capture the set of simulated sensor readings or the derivative set;

for at least one simulated API message in the simulated API message set, parse, from the at least one simulated API message, simulated message data comprising a message creation timestamp associated with simulating the operating parameter at the edge controller device and a gateway receipt timestamp associated with a operation of the API gateway;

generate a visualizer comprising a set of input items; and responsive to detecting a user interaction with at least one of the input items, generate a first visualization comprising an aggregation of the simulated message data that correspond to the at least one of the input items, wherein the aggregation comprises an indication of system latency between the edge controller device and the API gateway, the indication of system latency based on the message creation timestamp and the gateway receipt timestamp; and generate a second visualization comprising the simulated message data corresponding to the generated aggregation.

7. The media of claim 6, wherein the API gateway comprises an internet-of-things gateway, a telematics server, an application router, a consolidated data store, or an asset utilization data store.

8. The media of claim 6, wherein the aggregation comprises at least one of a transaction count, a maximum value, a minimum value, and an average value.

9. The media of claim 6, wherein the aggregation comprises a visual indication that corresponds to a summary item for a subset of messages in the simulated API message set.

10. The media of claim 9, the instructions further comprising:

determine the subset of messages based on a particular detected input item.

11. The media of claim 10, wherein the particular detected input item comprises an indication of at least one of a transaction type, a file type, or a time window associated with message origination at the edge controller device.

12. The media of claim 6, wherein the second visualization comprises at least one of a virtual asset identifier, a virtual asset type, a transaction type, a file type, and a transaction status.

13. The media of claim 11, the instructions further comprising:

access a supplemental dataset for a particular virtual asset; and generate and display, via the second visualization, a hyperlink to a computing system associated with the supplemental dataset, wherein the hyperlink comprises a virtual asset identifier for the particular virtual asset.

14. The media of claim 6, the instructions further comprising:

generate a virtual organization associated with a subset of virtual assets in the set of virtual assets; and cause the visualizer to restrict at least one of allowable input items or the simulated API message set to the subset of virtual assets that correspond to the virtual organization.

15. A method for testing of fleet management software, the method comprising, by a computing system comprising circuitry provided to an edge controller device configured to transmit data to an API gateway in asset simulations, performing operations comprising:

generating a set of virtual assets, wherein the virtual assets are simulations of machinery in a fleet and wherein at least one asset in the set of virtual assets is associated with a set of simulated sensor readings, the set of simulated sensor readings relating to a simulated operating parameter of a particular virtual asset in the set of virtual assets;

causing the circuitry of the edge controller device to generate an electronic message to transmit the simulated sensor readings or a derivative set to the API gateway;

for the at least one asset in the set of virtual assets, causing the API gateway to generate a simulated application programming interface (API) message set structured to capture the set of simulated sensor readings or the derivative set;

for at least one simulated API message in the simulated API message set, parsing, from the at least one simulated API message, simulated message data comprising a message creation timestamp associated with simulating the operating parameter at the edge controller device and a gateway receipt timestamp associated with a operation of the API gateway;

generating a visualizer comprising a set of input items; and responsive to detecting a user interaction with at least one of the input items, generating a first visualization comprising an aggregation of the simulated message data that correspond to the at least one of the input items, wherein the aggregation comprises an indication of system latency between the edge controller device and the API gateway, the indication of system latency based on the message creation timestamp and the gateway receipt timestamp; and generating a second visualization comprising the simulated message data corresponding to the generated aggregation.

16. The method of claim 15, wherein the API gateway comprises an internet-of-things gateway, a telematics server, an application router, a consolidated data store, or an asset utilization data store.

17. The method of claim 15, the method further comprising:

accessing a supplemental dataset for a particular virtual asset; and generating and displaying, via the second visualization, a hyperlink to a computing system associated with the supplemental dataset, wherein the hyperlink comprises a virtual asset identifier for the particular virtual asset.

18. The method of claim 15, the method further comprising:

generating a virtual organization associated with a subset of virtual assets in the set of virtual assets; and causing the visualizer to restrict at least one of allowable input items or the simulated message set to the subset of virtual assets that correspond to the virtual organization.

* * * * *